(12) United States Patent
Chen et al.

(10) Patent No.: US 11,101,513 B2
(45) Date of Patent: Aug. 24, 2021

(54) THIN FILM BATTERY PACKAGING

(71) Applicant: International Business Machines Corporation, Armonk, NY (US)

(72) Inventors: Qianwen Chen, Yorktown Heights, NY (US); Bing Dang, Chappaqua, NY (US); Bo Wen, New York City, NY (US); Marlon Agno, Scarsdale, NY (US); John Knickerbocker, Orange, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 16/121,307

(22) Filed: Sep. 4, 2018

(65) Prior Publication Data
US 2020/0075906 A1 Mar. 5, 2020

(51) Int. Cl.
*H01M 50/116* (2021.01)
*H01M 10/0585* (2010.01)
*H01M 50/124* (2021.01)
*H01M 50/183* (2021.01)

(52) U.S. Cl.
CPC ..... *H01M 50/116* (2021.01); *H01M 10/0585* (2013.01); *H01M 50/124* (2021.01); *H01M 50/183* (2021.01)

(58) Field of Classification Search
CPC .... H01M 2/0267; H01M 2/0287; H01M 2/08; H01M 10/0585; H01M 50/116; H01M 50/124; H01M 50/183
See application file for complete search history.

(56) References Cited

U.S. PATENT DOCUMENTS

| | | | |
|---|---|---|---|
| 7,553,582 | B2 | 6/2009 | Bates |
| 8,394,522 | B2 | 3/2013 | Snyder et al. |
| 8,518,581 | B2 | 8/2013 | Neudecker et al. |
| 9,806,302 | B2 | 10/2017 | Kim et al. |
| 2008/0003493 | A1* | 1/2008 | Bates ............... H01M 10/0525 429/66 |
| 2010/0291431 | A1 | 11/2010 | Shih et al. |
| 2011/0076567 | A1* | 3/2011 | Bouillon ............ H01M 4/0423 429/246 |

(Continued)

FOREIGN PATENT DOCUMENTS

WO 2008116694 A1 10/2008

OTHER PUBLICATIONS

Pearsea, Alexander J. "Three-Dimensional Solid-State Lithium-Ion Batteries Fabricated Via Conformal Vapor-Phase Chemistry." American Chemical Society 2018. 32 pages. https://arxiv.org/pdf/1709.02918.pdf.

*Primary Examiner* — Olatunji A Godo
(74) *Attorney, Agent, or Firm* — Amin, Turocy & Watson, LLP

(57) ABSTRACT

Techniques regarding a thin film battery, which can comprise one or more sealing layers, and a method of manufacturing thereof are provided. For example, one or more embodiments described herein can regard an apparatus that can comprise a thin film battery cell encapsulated in a multi-layer stack comprising an adhesive layer located between a first substrate layer and a second substrate layer. The apparatus can also comprise a metal sealing layer at least partially surrounding the multi-layer stack.

18 Claims, 13 Drawing Sheets

(56) References Cited

U.S. PATENT DOCUMENTS

| | | | |
|---|---|---|---|
| 2011/0094094 A1* | 4/2011 | Li | H01M 10/0436 29/623.5 |
| 2012/0141838 A1* | 6/2012 | Lin | H01M 10/4257 429/7 |
| 2016/0240831 A1 | 8/2016 | Zeng et al. | |
| 2017/0263973 A1 | 9/2017 | Peuchert et al. | |
| 2017/0301954 A1* | 10/2017 | Kwak | H01M 4/382 |

* cited by examiner

CUTTING A TRENCH INTO A BATTERY PANEL TO ISOLATE A THIN FILM BATTERY CELL FROM A PORTION OF THE BATTERY PANEL — 1102

DEPOSITING A METAL LAYER ONTO THE BATTERY PANEL AND INTO THE TRENCH TO FORM A BOND AROUND THE THIN FILM BATTERY CELL — 1104

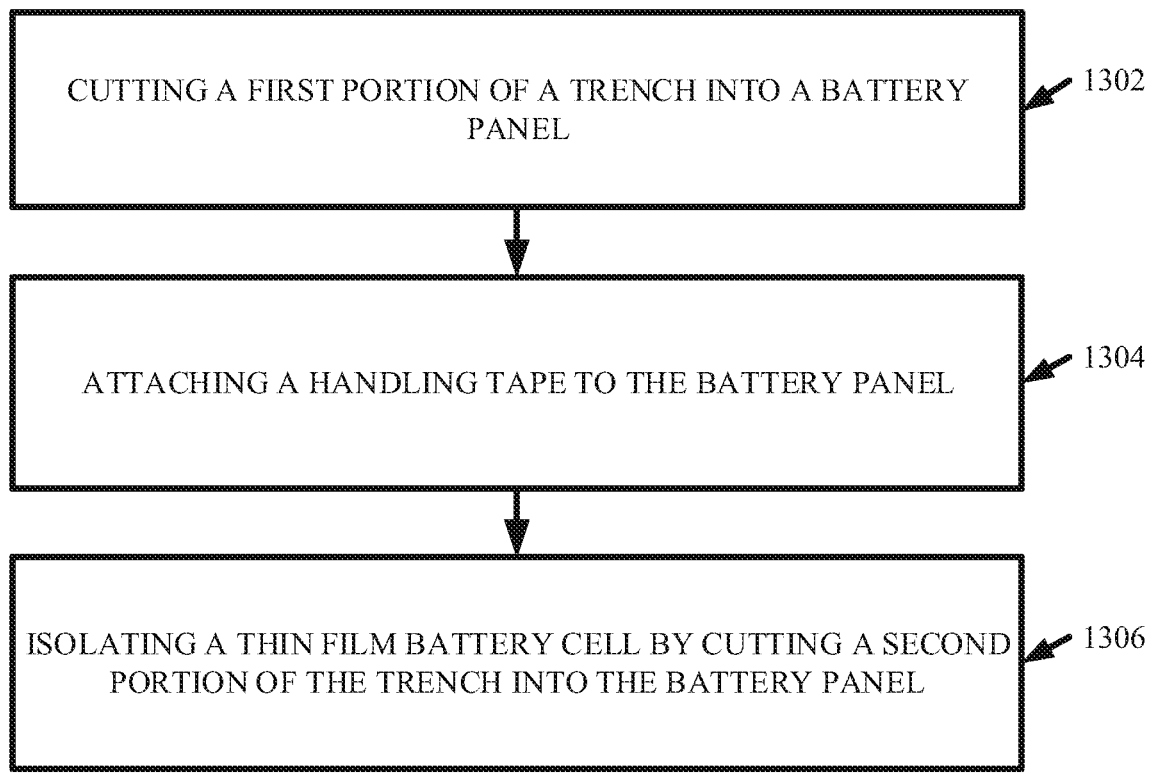

THIN FILM BATTERY PACKAGING

BACKGROUND

The subject disclosure relates to thin film battery packaging, and more specifically, to one or more thin film battery structures and/or manufacturing methods.

Thin film batteries can be used in a variety of applications that require small batteries with high energy density, such as the field of microelectronics. The small dimensions of thin film batteries enable multiple thin film batteries to be housed within a battery panel. For example, the battery panel can include an adhesive located between two or more substrate layers. To isolate one or more batteries comprised within a subject battery panel, conventional techniques cut the battery panel around the desired batteries.

However, cutting the battery panel can cause edge damage (e.g., due to expose to heat or other reasons such as contamination) around the resulting thin film battery cell. Further, the edge damage can lead to leakages (e.g., gas permeation) and/or contamination of one or more components of the desired thin film battery cell. Moreover, a mechanical strength of the thin film battery cell can be compromised due to a lack of support previously provided by the intact battery panel. Thus, conventional singulation techniques for isolating one or more thin film batteries from a battery panel can cause diminishment of the seal and/or structural integrity of the thin film batteries and can thereby limit the functional operation and/or life of the thin film batteries.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, apparatuses and/or methods regarding one or more thin film batteries that can comprise one or more sealing layers, which can create a hermetic seal, are described.

According to an embodiment, an apparatus is provided. The apparatus can comprise a thin film battery cell encapsulated in a multi-layer stack comprising an adhesive layer located between a first substrate layer and a second substrate layer. The apparatus can also comprise a metal sealing layer at least partially surrounding the multi-layer stack. An advantage of such an apparatus can be that the metal sealing layer can provide mechanical strength to the thin film battery cell.

In some examples, the metal sealing layer of the apparatus can form a hermetic seal around the thin film battery cell and the multi-layer stack. An advantage of such an apparatus can be an increased amount of protection provided to one or more components of the thin film battery cell.

According to an embodiment, a method is provided. The method can comprise cutting a trench into a battery panel to isolate a thin film battery cell from a portion of the battery panel. The method can also comprise depositing a metal layer onto the battery panel and into the trench to form a bond around the thin film battery cell. An advantage of such a method can be that a metal sealing layer can be deposited surrounding the thin film battery cell to form a hermetic seal.

In some examples, the method can comprise a first cutting, which can comprise cutting a first portion of the trench. The method can further comprise a second cutting, which can comprise cutting a second portion of the trench. Additionally, the first portion of the trench and the second portion of the trench can connect to form the trench. An advantage of such a method can be that the multi-step cutting process can facilitate a multi-step deposition process of the metal; thereby the structural integrity of the thin film battery cell can be maintained even through isolation from the battery panel.

According to an embodiment, a method is provided. The method can comprise cutting a first portion of a trench into a battery panel. The method can also comprise attaching a handling tape to the battery panel. Further, the method can comprise isolating a thin film battery cell by cutting a second portion of the trench into the battery panel. An advantage of such a method can be that the handling tape can low cost, precision handling of the thin film battery cell during one or more manufacturing processes.

In some examples, the method can comprise depositing a metal onto the battery panel and into the trench to form a hermetic seal around the thin film battery cell, wherein the metal is selected from a group consisting of titanium, copper, aluminum, nickel, indium, tin, chromium, cobalt, gold, silicon, alloys thereof, and oxides thereof. An advantage of such a method can be that low cost deposition processes can be utilized to deposit the metal and create the hermetic seal.

BRIEF DESCRIPTION OF THE DRAWINGS

FIG. 11 illustrates a flow diagram of an example, non-limiting method that can facilitate manufacturing one or more thin film batteries comprising one or more sealing layers in accordance with one or more embodiments described herein.

FIG. 13 illustrates a flow diagram of an example, non-limiting method that can facilitate manufacturing one or more thin film batteries comprising one or more sealing layers in accordance with one or more embodiments described herein.

DETAILED DESCRIPTION

Figure 1A:
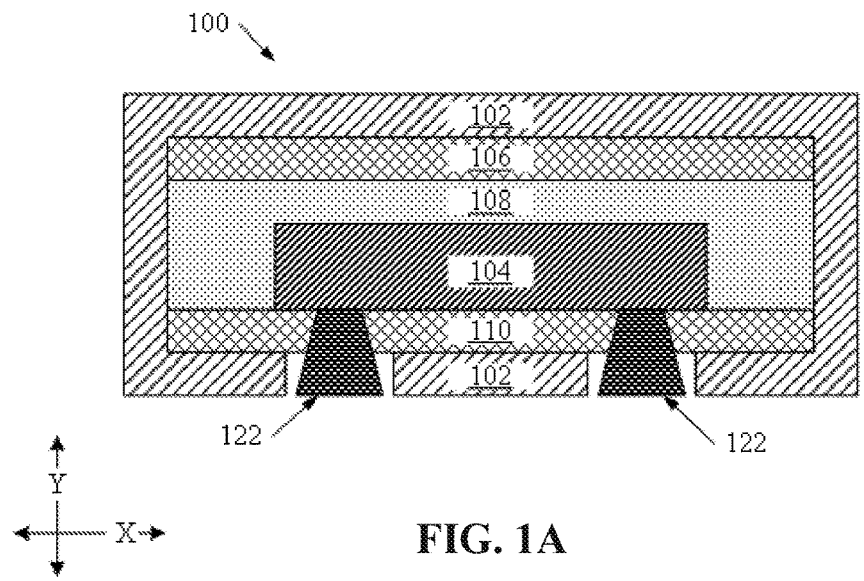
FIG. 1A illustrates a diagram of an example, non-limiting thin film battery that can comprise one or more sealing layers in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. With regards to the drawings, various shadings and/or cross-hatching can be used to indicate features and/or materials that are the same and/or alike.

Given the problems with conventional singulation techniques for achieving one or more thin film batteries; the present disclosure can be implemented to produce a solution to one or more problems in the form of one or more sealing layers that can create a hermetic seal around one or more thin film battery cells and/or provide mechanical strength to one or more thin film battery cells. The one or more sealing layers can surround one or more thin film battery cells to seal the thin film battery cells and thereby protect the internal components of the thin film battery cells from contamination, corrosion, and/or other forms of deterioration. Additionally, the one or more sealing layers can advantageously provide mechanical support to an otherwise fragile thin film battery cell.

Various embodiments described herein can regard one or more sealing layers that can at least partially surround one or more thin film battery cells. For example, the one or more sealing layers can create a hermetic seal around the one or more thin film battery cells. In one or more embodiments, the one or more sealing layers can comprise polymers, ceramics, and/or metals. For instance, the one or more sealing layers can comprise a metal layer that can provide enhanced mechanical strength to the one or more thin film battery cells. Additionally, one or more embodiments can regard methods that can facilitate the manufacturing of one or more thin film battery cells comprising the one or more sealing layers comprised herein. For example, one or more methods described herein can utilized multi-step cutting process to maintain an integrity of the one or more thin film battery cells while depositing the one or more sealing layers. In one or more further examples, the one or more methods described herein can utilized one or more handling tapes to facilitate manipulation of the one or more thin film battery cells during the multi-step cutting process and/or deposition process.

FIG. 1 illustrates a diagram of an example, non-limiting thin film battery 100 that can comprise one or more sealing layers 102 at least partially surrounding one or more thin film battery cells 104 in accordance with one or more embodiments described herein. As shown in FIG. 1, the one or more thin film battery cells 104 can be encapsulated within a multi-layer battery panel comprising a first substrate layer 106, an adhesive layer 108, and/or a second substrate layer 110.

The one or more thin film battery cells 104 can comprise, for example: one or more cathode current collectors 112, one or more anode current collectors 114, one or more cathodes 116, one or more solid electrolytes 118, one or more anodes 120, and/or one or more vias 122. For instance, in one or more embodiments the one or more solid electrolytes 118 can be positioned between the one or more anodes 120 and cathodes 116, wherein the one or more cathodes 116 can be coupled (e.g., adjacent) to the one or more cathode current collectors 112 and/or the one or more anodes 120 can be coupled (e.g., adjacent) to the one or more anode current collectors 114. The one or more cathode current collectors 112 can exemplary comprise, but are not limited to: aluminum, platinum, titanium, palladium, nickel, silver, gold, a combination thereof, and/or the alternate cathode current collectors. The one or more anode current collectors 114 can exemplary comprise, but are not limited to: aluminum, platinum, titanium, palladium, nickel, silver, gold, a combination thereof, and/or the alternate anode current collectors. The one or more cathodes 116 can exemplary comprise, but are not limited to: lithium metal, oxides with examples of lithium, lithium nickel oxide, lithium cobalt oxide, lithium manganese oxides, lithium manganese-nickel oxides, a combination thereof, and/or the like. The one or more solid electrolytes 118 can exemplary comprise, but are not limited to: one or more lithium phosphorus oxy-nitride thin layers, a combination thereof (e.g., including various stoichiometric forms wherein the electrolyte can provide a high ionic conductivity while minimizing stress and/or support low electrical resistance in the thin film battery 100), and/or the like. The one or more anodes 120 can exemplary comprise, but are not limited to: carbon films, silicon, silicon composites, tin, lithium composites, lithium, lithium nickel oxide, lithium cobalt oxide, lithium manganese oxides, lithium manganese-nickel oxides, germanium, a combination thereof, and/or the like. One of ordinary skill in the art will recognize that the components of the one or more thin film battery cells 104 can be positioned in a variety of arrangements to facilitate functionality of the thin film battery 100. For example, FIGS. 1B-1D depict exemplary embodiments of the one or more thin film battery cells 104.

Figure 1B:
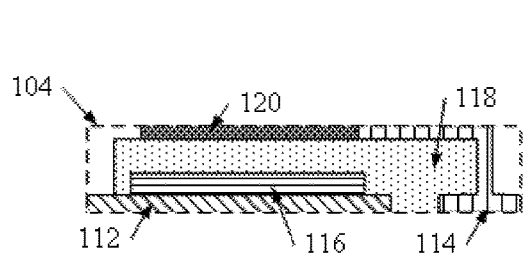
FIG. 1B illustrates a diagram of an example, non-limiting thin film battery cell that can be comprised within one or more thin film batteries in accordance with one or more embodiments described herein.

FIG. 1B illustrates a diagram of an example, non-limiting embodiment of the one or more thin film battery cells 104. Repetitive description of like elements employed in other embodiments described herein is omitted for sake of brevity. As shown in FIG. 1B, the one or more cathode current collectors 112, one or more anode current collectors 114, one or more cathodes 116, one or more solid electrolytes 118, and/or one or more anodes 120 can be arranged in a single stack structure. The one or more cathode current collectors 112 and/or the one or more anode current collectors 114 can be positioned adjacent to respective vias 122 (e.g., shown in FIG. 1A) that can extend through the second substrate layer 110 and/or the one or more sealing layers 102. As depicted in FIG. 1A, the thin film battery cell 104 structure shown in FIG. 1B can be encapsulated within the adhesive layer 108 of the thin film battery 100. One of ordinary skill in the art will recognize that the single stack structure depicted in FIG. 1B is exemplary and alternate arrangements of the components comprising the thin film battery cell 104 are also envisaged.

Figure 1C:
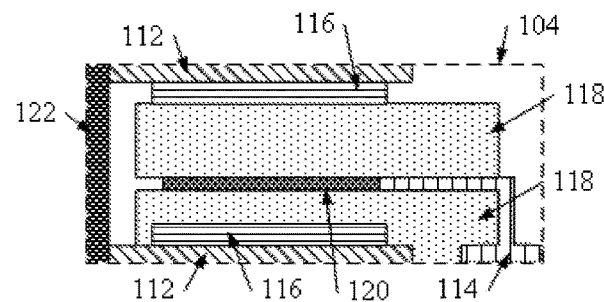
FIG. 1C illustrates a diagram of an example, non-limiting thin film battery cell that can be comprised within one or more thin film batteries in accordance with one or more embodiments described herein.

FIG. 1C illustrates another diagram of an example, non-limiting embodiment of the one or more thin film battery cells 104. Repetitive description of like elements employed in other embodiments described herein is omitted for sake of brevity. As shown in FIG. 1C, the one or more cathode current collectors 112, one or more anode current collectors 114, one or more cathodes 116, one or more solid electrolytes 118, and/or one or more anodes 120 can be arranged in a multi-stack structure. For example, an anode 120 can be positioned in parallel to multiple solid electrolytes 118, cathodes 116, and/or cathode current collectors 112. Further, two or more cathode current collectors 112 can be electrically connected through one or more vias 122. The one or more cathode current collectors 112 and/or the one or more anode current collectors 114 can be positioned adjacent to respective vias 122 (e.g., shown in FIG. 1A) that can extend through the second substrate layer 110 and/or the one or more sealing layers 102. As depicted in FIG. 1A, the thin film battery cell 104 structure shown in FIG. 1C can be encapsulated within the adhesive layer 108 of the thin film battery 100. One of ordinary skill in the art will recognize that the multi-stack structure depicted in FIG. 1C is exemplary and alternate arrangements of the components comprising the thin film battery cell 104 are also envisaged.

Figure 1D:
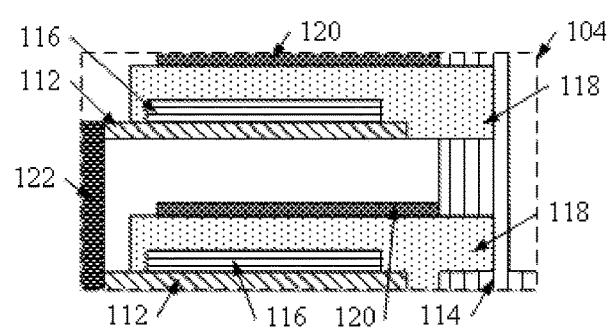
FIG. 1D illustrates a diagram of an example, non-limiting thin film battery cell that can be comprised within one or more thin film batteries in accordance with one or more embodiments described herein.

FIG. 1D illustrates another diagram of an example, non-limiting embodiment of the one or more thin film battery cells 104. Repetitive description of like elements employed in other embodiments described herein is omitted for sake of brevity. As shown in FIG. 1D, the one or more cathode current collectors 112, one or more anode current collectors 114, one or more cathodes 116, one or more solid electrolytes 118, and/or one or more anodes 120 can be arranged in a spaced multi-stack structure. For example, one or more stack structures (e.g., single stack structures as shown in FIG. 1B or multi-stack structures as shown in FIG. 1C) can be positioned over one or more other stack structures (e.g., single stack structures as shown in FIG. 1B or multi-stack structures as shown in FIG. 1C), while separate by a defined space. For instance, one or more anode current collectors 114 (e.g., as shown in FIG. 1D) or one or more cathode current collectors 112 can facilitate the creation of a space between the two or more stack structures. The space can comprise, for example, at least a portion of the adhesive layer 108. The one or more cathode current collectors 112 and/or the one or more anode current collectors 114 can be positioned adjacent to respective vias 122 (e.g., shown in FIG. 1A) that can extend through the second substrate layer 110 and/or the one or more sealing layers 102. As depicted in FIG. 1A, the thin film battery cell 104 structure shown in FIG. 1D can be encapsulated within the adhesive layer 108 of the thin film battery 100. One of ordinary skill in the art will recognize that the spaced multi-stack structure depicted in FIG. 1D is exemplary and alternate arrangements of the components comprising the thin film battery cell 104 are also envisaged.

Referring again the FIG. 1A, in one or more embodiments the first substrate layer 106 and the second substrate layer 110 can comprise the same materials. Alternatively, the first substrate layer 106 and the second substrate layer 110 can comprise different materials. Example materials that can comprise the first substrate layer 106 and/or the second substrate layer 110 can include, but are not limited to: a ceramic, a metal with a surface and/or via hole dielectric (e.g., a metal oxide, metal nitride, and/or alternative dielectric layer), silicon, glass, mica, one or more polymers (e.g., polymers thereof), a combination thereof, and/or the like. Similarly, a thickness (e.g., along the "Y" axis shown in FIG. 1A) of the first substrate layer 106 and the second substrate layer 110 can be substantially equal. Alternatively, a thickness (e.g., along the "Y" axis shown in FIG. 1A) of the first substrate layer 106 and the second substrate layer 110 can be different. For example, the thickness of the first substrate layer 106 and/or the thickness of the second substrate layer 110 can be greater than or equal to 0.5 microns and less than or equal to 500 microns (e.g., between 5 microns and 60 microns).

The one or more adhesive layers 108 can encapsulate the one or more thin film battery cells 104 and/or connect the first substrate layer 106 to the second substrate layer 110. The one or more adhesive layers 108 can be insulating and/or selectively conductive (e.g., permitting conduction through the one or more adhesive layers 108 at specific points, while providing insulation at other points). Example materials that can comprise the one or more adhesive layers 108 can include, but are not limited to: polyimide, cyclic olefin copolymer, benzocyclobutene, epoxy polymer adhesives, rubber adhesives, molding compounds (e.g., thermoplastic or thermoset materials), silicones, polyurethane, polysulfide, styrene-butadiene rubber, acrylic, polyacrylate, polyisobutylene, vinyl, nitrile compounds, a combination thereof, and/or the like. An exemplary thickness (e.g., along the "Y" axis shown in FIG. 1A) of the one or more adhesive layers 108 can be greater than or equal to 1 micron and less than or equal to tens of millimeters (e.g., 1 micron to 40 microns).

As shown in FIG. 1A, one or more vias 122 can extend through the second substrate layer 110 and/or the one or more sealing layers 102 to facilitate one or more electrical connections between the one or more thin film battery cells 104 and one or more other electrical components. Additionally, or alternatively, the thin film battery 100 can comprise one or more vias 122 extending through the one or more adhesive layers 108 and/or the one or more sealing layers 102 to facilitate one or more electrical connections between the one or more thin film battery cells 104 and one or more other electrical components. The one or more vias 122 can comprise, for example, one or more wires to facilitate one or more electrical connections. In one or more embodiments, the one or more vias 122 can be connected to one or more electrical conductors, dielectric insulators, and/or wireless antennas and/or pads. The one or more vias 122 can facilitate, for example: electrical power transfer, a recharging of the thin-film battery 100, power monitoring of the thin film battery 100, a combination thereof, and/or the like.

The one or more sealing layers 102 can comprise one or more metal layers. Example materials that can comprise the one or more sealing layers 102 can include, but are not limited to: titanium (Ti), copper (Cu), aluminum (Al), nickel (Ni), indium (In), tin (Sn), chromium (Cr), cobalt (Co), gold (Au), silicon (Si), alloys thereof, and oxides thereof, a combination thereof, and/or the like. Exemplary traits that can characterize the one or more sealing layers 102 can include, but are not limited to: a deposited metal film, a single layer or multi-layer structure of one or more metal layers or one or more dielectric layers, and/or one or more metal layers wherein the one or more sealing layers 102 can encapsulate the one or more thin film battery cells 104 on all sides while permitting electrical isolation for pass through the one or more vias 122 (e.g., electrical connections. An exemplary thickness (e.g., along the "Y" axis on the top and/or bottom the thin film battery 100 and/or along the "X" axis on the other sides of the thin film battery 100) of the one or more sealing layers 102 can be greater than or equal to 0.5 microns and less than or equal to several millimeters (e.g., between 0.5 microns and 100 microns).

In one or more embodiments, the one or more sealing layers 102 can create a hermetic seal around the section of battery panel (e.g., comprising the first substrate layer 106, the one or more adhesive layers 108, and/or the second substrate layer 110) housing the one or more thin film battery cells 104. For example, the one or more sealing layers 102 can form a continuous layer surrounding the subject section of battery panel housing the one or more thin film battery cells 104. For instance, the one or more sealing layers 102, if comprised of one or more electrically conductive metal layers, can be isolated from the one or more vias 122 (e.g., electrical connections) by utilizing a dielectric insulator such as: one or more metal oxides and/or metal nitride layers, one or more dielectric ceramic layers, one or more polymer layers (e.g., rubber), and/or a combination of electrical insulators (e.g., located between the one or more vias 122 and/or passing through the one or more vias 122 and/or the one or more sealing layer or layers 102). Advantageously, the one or more sealing layers 102 can also provide enhanced mechanical strength to the subject section of battery panel housing the one or more thin film battery cells 104; thereby granting the thin film battery 100 structural integrity that could not have otherwise been achieved. Moreover, in the one or more embodiments the one or more sealing layers 102 can partially surround the section of battery panel (e.g., comprising the first substrate layer 106, the one or more adhesive layers 108, and/or the second substrate layer 110) housing the one or more thin film battery cells 104. For example, the one or more sealing layers 102 can be provided on one or more sections of the subject section of battery panel to enhance mechanical strength.

Additionally, in one or more embodiments the one or more sealing layers 102 can be spaced a defined distance away from the section of the battery panel that houses the one or more thin film battery cells 104. For example, a space gap and/or a compressible polymer can be positioned between the one or more sealing layers 102 and the section of the battery panel that houses the one or more thin film battery cells 104. For instance, the compressible polymer can support volumetric expansion and/or contraction of the thin film battery cell 104 between 2 percent and/or 20 percent, which can be caused by charging and/or discharging of the thin film battery 100, while minimizing reliability degradation due to cyclic mechanical stresses in the structure.

Figure 2A:
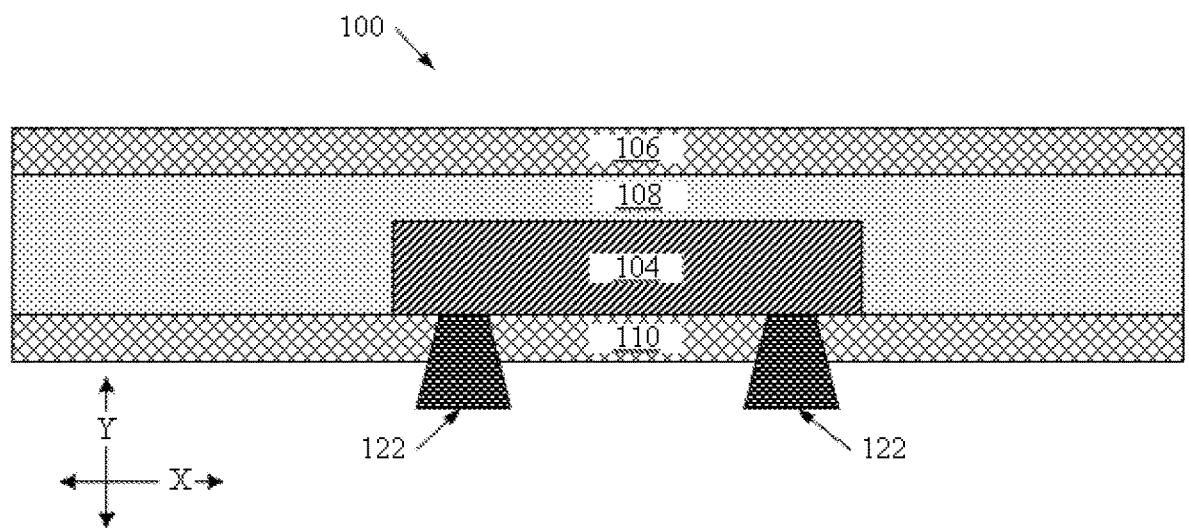
FIG. 2A illustrates a diagram of an example, non-limiting thin film battery cell embedded within a battery panel from which a sealed thin film battery can be derived in accordance with one or more embodiments described herein.

FIG. 2A illustrates a diagram of an example, non-limiting side view of a thin film battery cell 104 comprised within a battery panel in accordance with one or more embodiments described herein. Repetitive description of like elements employed in other embodiments described herein is omitted for sake of brevity. As shown in FIG. 2A, the one or more thin film battery cells 104 can be housed within a battery panel comprising the first substrate layer 106, the one or more adhesive layers 108, and/or the second substrate layer 110. One of ordinary skill in the art will recognize that while FIG. 2A depicts a single thin film battery cell 104 housed within the battery panel, multiple thin film battery cells 104 are also envisaged. For example, the battery panel can comprise multiple thin film battery cells 104, wherein one or more of the thin film battery cells 104 can be subject to an isolation process from the rest of the battery panel to facilitate creation of the one or more thin film batteries 100.

Figure 2B:
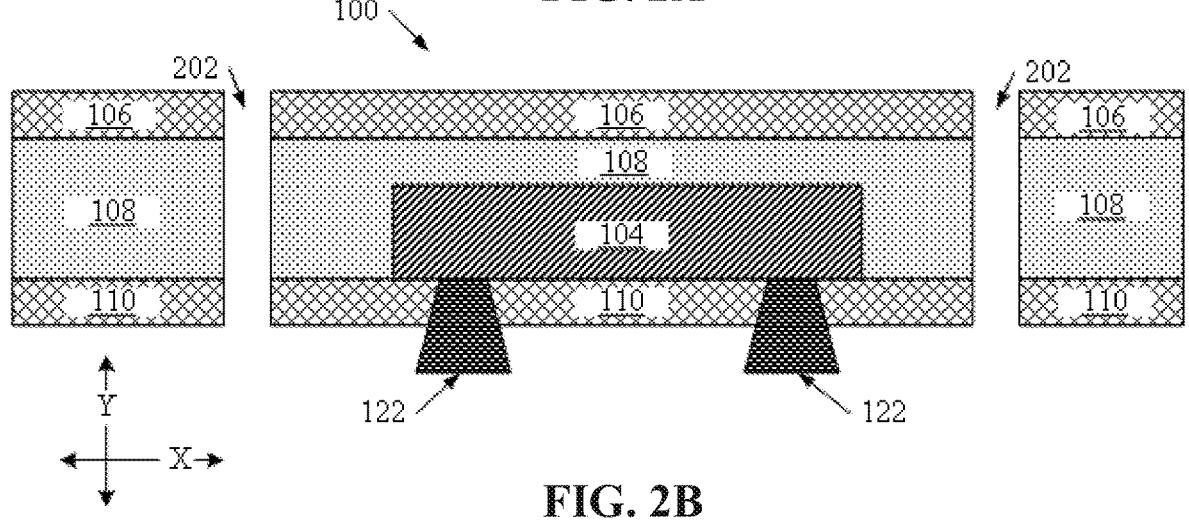
FIG. 2B illustrates a diagram of an example, non-limiting side view of a thin film battery during a first manufacturing stage in accordance with one or more embodiments described herein.

FIG. 2B illustrates a diagram of an example, non-limiting side view of a thin film battery 100 during a first stage of manufacturing in accordance with one or more embodiments described herein. Repetitive description of like elements employed in other embodiments described herein is omitted for sake of brevity. At a first stage of manufacturing, a first cut can be performed into the battery panel to begin an isolation process of the one or more thin film battery cells 104 from the rest of the battery panel and/or define one or more dimensions of the thin film battery 100. For example, one or more first trenches 202 can be cut into the battery panel adjacent to the one or more subject thin film battery cells 104. The one or more first trenches 202 can be cut into the battery panel such that the portion of the battery panel that houses the subject one or more thin film battery cells 104 remains at least partially connected to rest of the battery panel.

As shown in FIG. 2B, in one or more embodiments the first cut can comprise cutting one or more first trenches 202 through an entire thickness (e.g., along the "Y" axis shown in FIG. 2B) of the battery panel. Thus, the depth of the one or more first trenches 202 can be dependent on the thickness of the battery panel. Additionally, a width (e.g., along the "X" axis shown in FIG. 2B) of the one or more first trenches 202 can vary depending on the materials comprising the one or more sealing layers 102. For instance, an exemplary width of the one or more first trenches 202 can be greater than or equal to 2 microns and less than or equal to tens of millimeters (e.g., between 2 microns and 1000 microns). Further, cutting the one or more first trenches 202 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like.

Figure 2C:
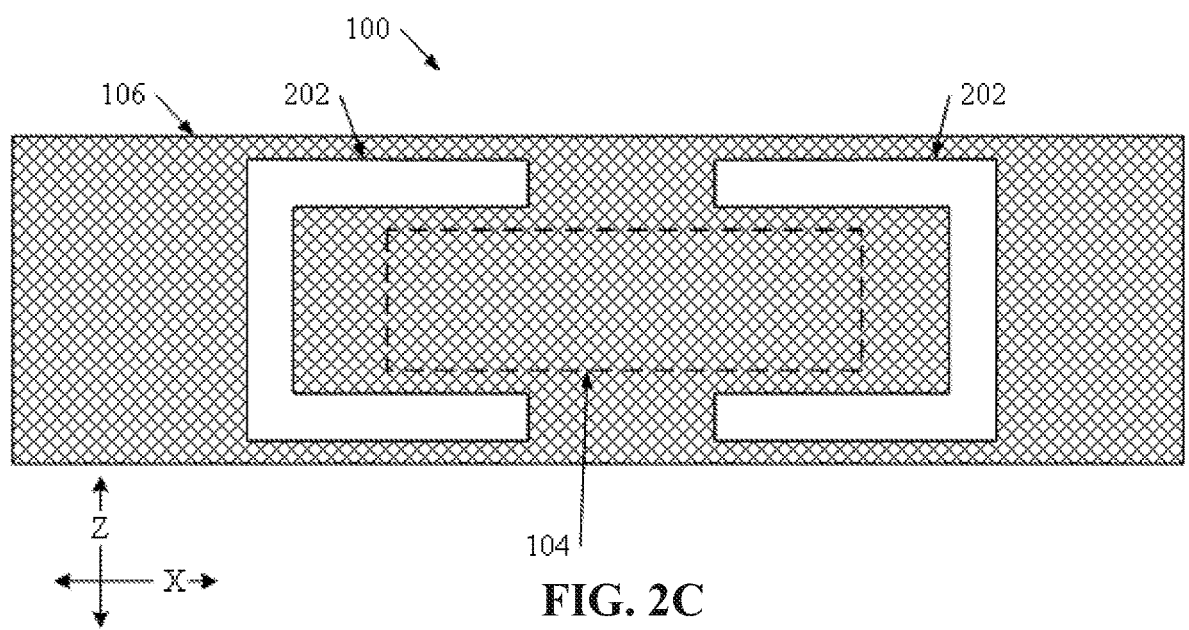
FIG. 2C illustrates a diagram of an example, non-limiting top-down view of a thin film battery during a first manufacturing stage in accordance with one or more embodiments described herein.

FIG. 2C illustrates a diagram of an example, non-limiting top-down view of a thin film battery 100 during the first stage of manufacturing in accordance with one or more embodiments described herein. Repetitive description of like elements employed in other embodiments described herein is omitted for sake of brevity. As shown in FIG. 2C, the dashed lines can indicate the location of the one or more thin film battery cells 104 within the battery panel. FIG. 2C depicts an embodiment in which the one or more first trenches 202 partially surround the one or more thin film battery cells 104 and extend through an entire thickness (e.g., along the "Y" axis shown in FIG. 2B) of the battery panel. Since the one or more first trenches 202 partially surround the one or more thin film battery cells 104, one or more portions of the battery panel can connect the section of the battery panel housing the one or more thin film battery cells 104 and the rest of the battery panel. The one or more connections established by the described one or more portions of battery panel can facilitate maintaining an integrity of the thin film battery 100 as it proceeds to further stages of development.

Figure 3A:
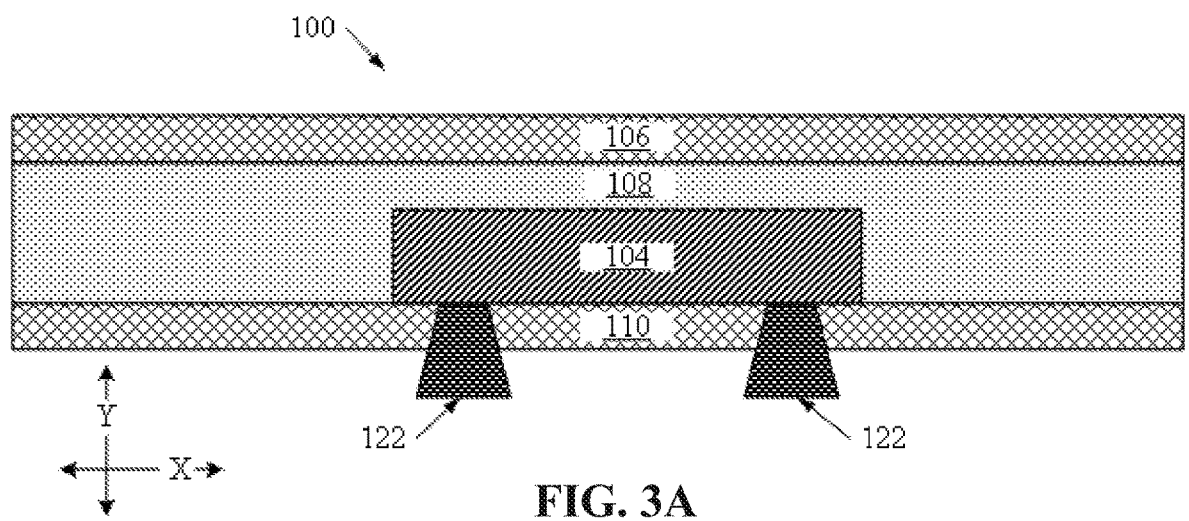
FIG. 3A illustrates a diagram of an example, non-limiting thin film battery cell embedded within a battery panel from which a sealed thin film battery can be derived in accordance with one or more embodiments described herein.

FIG. 3A illustrates a diagram of an example, non-limiting side view of a thin film battery cell 104 comprised within a battery panel in accordance with one or more embodiments described herein. Repetitive description of like elements employed in other embodiments described herein is omitted for sake of brevity. FIG. 3A depicts the features described herein with regards to FIG. 2A but illustrated on the same page as FIGS. 3B and 3C to ease visualization of another embodiment of the first stage of manufacturing the thin film battery 100.

Figure 3B:
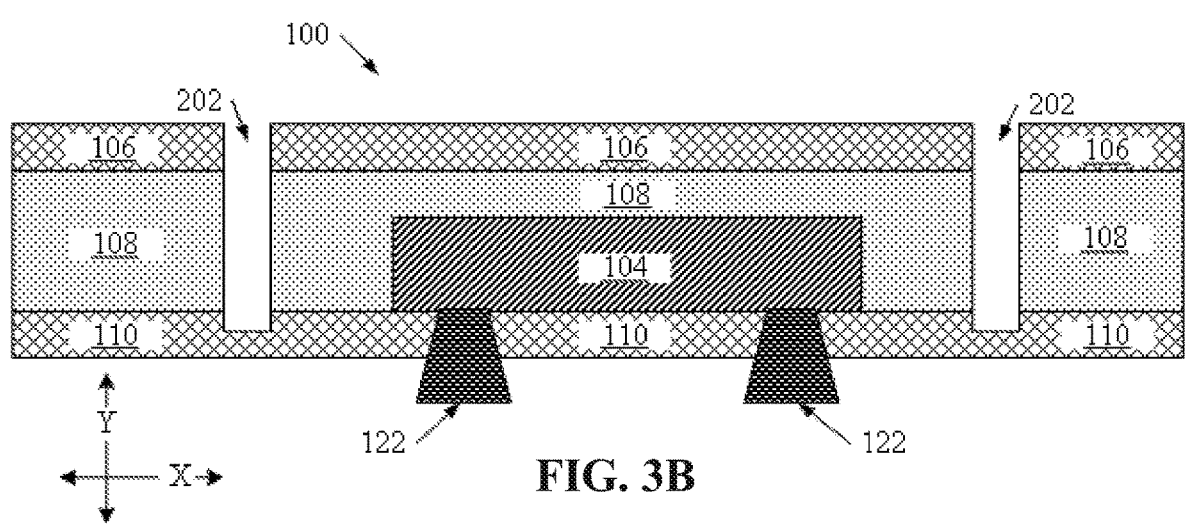
FIG. 3B illustrates a diagram of an example, non-limiting side view of a thin film battery during a first manufacturing stage in accordance with one or more embodiments described herein.

FIG. 3B illustrates a diagram of an example, non-limiting side view of a thin film battery 100 during a first stage of manufacturing in accordance with one or more embodiments described herein. Repetitive description of like elements employed in other embodiments described herein is omitted for sake of brevity. FIG. 3B depicts an alternate embodiment of the first stage of manufacturing (e.g., the first cutting processes to form one or more first trenches 202) in which the one or more first trenches 202 are shallower than the thickness (e.g., along the "Y" axis shown in FIG. 3B) of the battery panel.

Rather than extending entirely through the thickness of the battery panel, FIG. 3B illustrates that the one or more first trenches 202 can extend a length that is less than the thickness of the battery panel. Thus, the one or more first trenches 202 can extend partially through the battery panel. For example, the one or more first trenches 202 can extend through the first substrate layer 106 and/or the one or more adhesive layers 108 but not entirely through the second substrate layer 110. One of ordinary skill in the art will recognize that: the depth of the one or more first trenches 202 depicted in FIG. 3B is exemplary; the depth of the one or more first trenches 202 can vary depending on the desire of the manufacture; and alternate first trench 202 depths to that depicted in FIG. 3B are also envisaged. For example, the one or more first trenches 202 can extend to a depth greater than or equal to 2 microns and/or less than or equal to tens of millimeters (e.g., between 2 microns and 1000 microns). Further, cutting the one or more first trenches 202 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like.

Figure 3C:
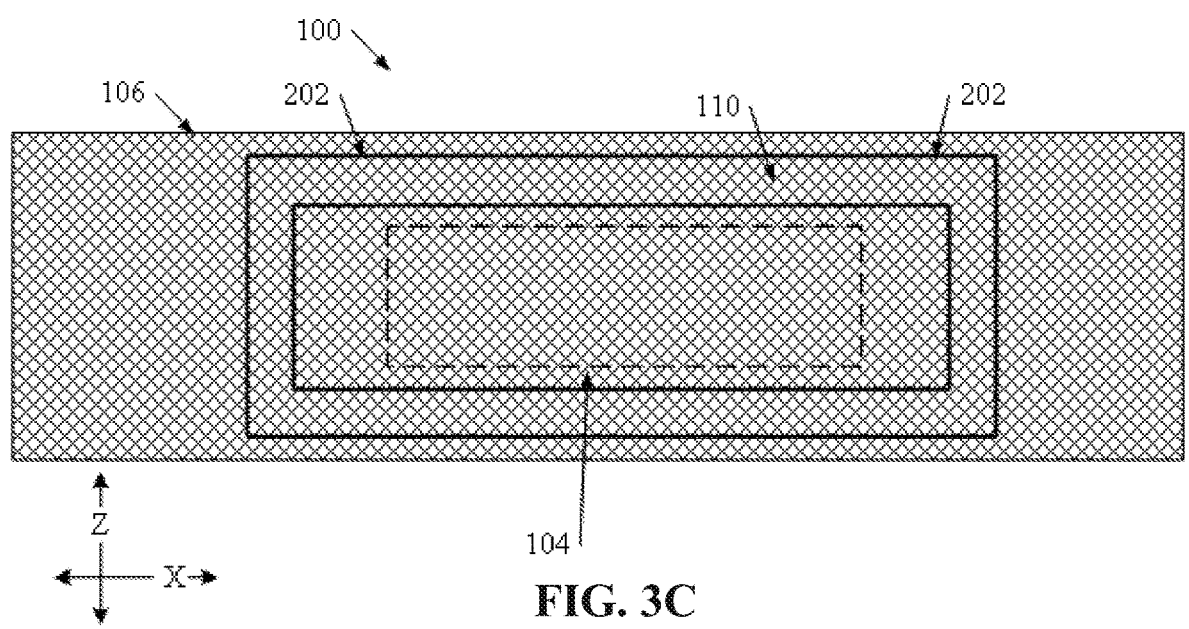
FIG. 3C illustrates a diagram of an example, non-limiting top-down view of a thin film battery during a first manufacturing stage in accordance with one or more embodiments described herein.

FIG. 3C illustrates a diagram of an example, non-limiting top-down view of a thin film battery 100 during the first stage of manufacturing in accordance with one or more embodiments described herein. Repetitive description of like elements employed in other embodiments described herein is omitted for sake of brevity. As shown in FIG. 3C, the dashed lines can indicate the location of the one or more thin film battery cells 104 within the battery panel. FIG. 3C depicts an embodiment in which the one or more first trenches 202 partially or completely surround the one or more thin film battery cells 104 while extending through a portion of the thickness (e.g., along the "Y" axis shown in FIG. 3B) of the battery panel. Since the one or more first trenches 202 do not extend entirely through the thickness of the battery panel, one or more portions of the battery panel (e.g., the second substrate layer 110) can connect the section of the battery panel housing the one or more thin film battery cells 104 and the rest of the battery panel. The one or more connections established by the described one or more portions of battery panel can facilitate maintaining an integrity of the thin film battery 100 as it proceeds to further stages of development.

Figure 4A:
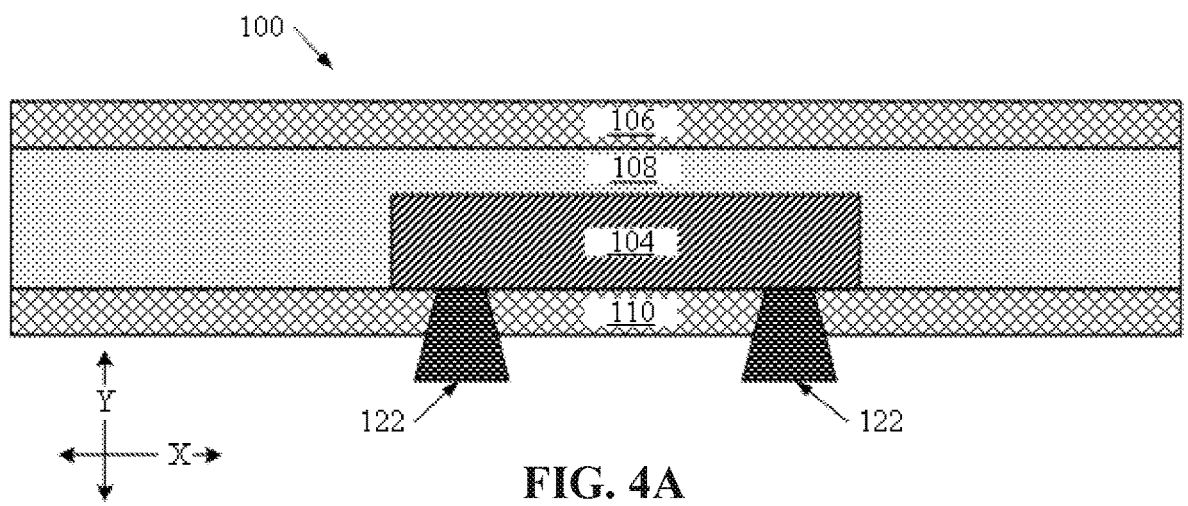
FIG. 4A illustrates a diagram of an example, non-limiting thin film battery cell embedded within a battery panel from which a sealed thin film battery can be derived in accordance with one or more embodiments described herein.

FIG. 4A illustrates a diagram of an example, non-limiting side view of a thin film battery cell 104 comprised within a battery panel in accordance with one or more embodiments described herein. Repetitive description of like elements employed in other embodiments described herein is omitted for sake of brevity. FIG. 4A depicts the features described herein with regards to FIG. 2A but illustrated on the same page as FIGS. 4B and 4C to ease visualization of another embodiment of the first stage of manufacturing the thin film battery 100.

Figure 4B:
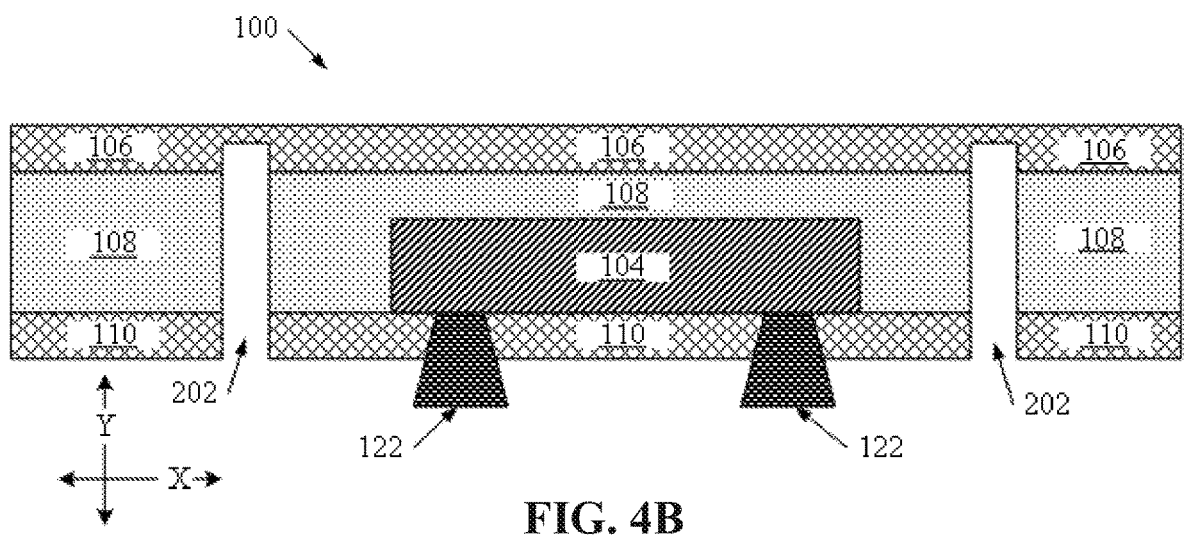
FIG. 4B illustrates a diagram of an example, non-limiting side view of a thin film battery during a first manufacturing stage in accordance with one or more embodiments described herein.

FIG. 4B illustrates a diagram of an example, non-limiting side view of a thin film battery 100 during a first stage of manufacturing in accordance with one or more embodiments described herein. Repetitive description of like elements employed in other embodiments described herein is omitted for sake of brevity. FIG. 4B depicts an alternate embodiment of the first stage of manufacturing (e.g., the first cutting processes to form one or more first trenches 202) in which the one or more first trenches 202 are shallower than the thickness (e.g., along the "Y" axis shown in FIG. 4B) of the battery panel.

Rather than extending entirely through the thickness of the battery panel, FIG. 4B illustrates that the one or more first trenches 202 can extend a length that is less than the thickness of the battery panel. Thus, the one or more first trenches 202 can extend partially through the battery panel. Further, FIG. 4B exemplifies that the one or more first trenches 202 can extend from either the top or the bottom of the battery panel. For example, the one or more first trenches 202 can extend through the second substrate layer 110 and/or the one or more adhesive layers 108 but not entirely through the first substrate layer 106. One of ordinary skill in the art will recognize that: the depth of the one or more first trenches 202 depicted in FIG. 4B is exemplary; the depth of the one or more first trenches 202 can vary depending on the desire of the manufacture; and first trench 202 depths alternate to that depicted in FIG. 4B are also envisaged. For example, the one or more first trenches 202 can extend to a depth greater than or equal to 5 percent total thickness of the battery panel and/or less than or equal to 100 percent total thickness of the battery panel (e.g., between tens of microns and tens of millimeters). Further, cutting the one or more first trenches 202 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like.

Figure 4C:
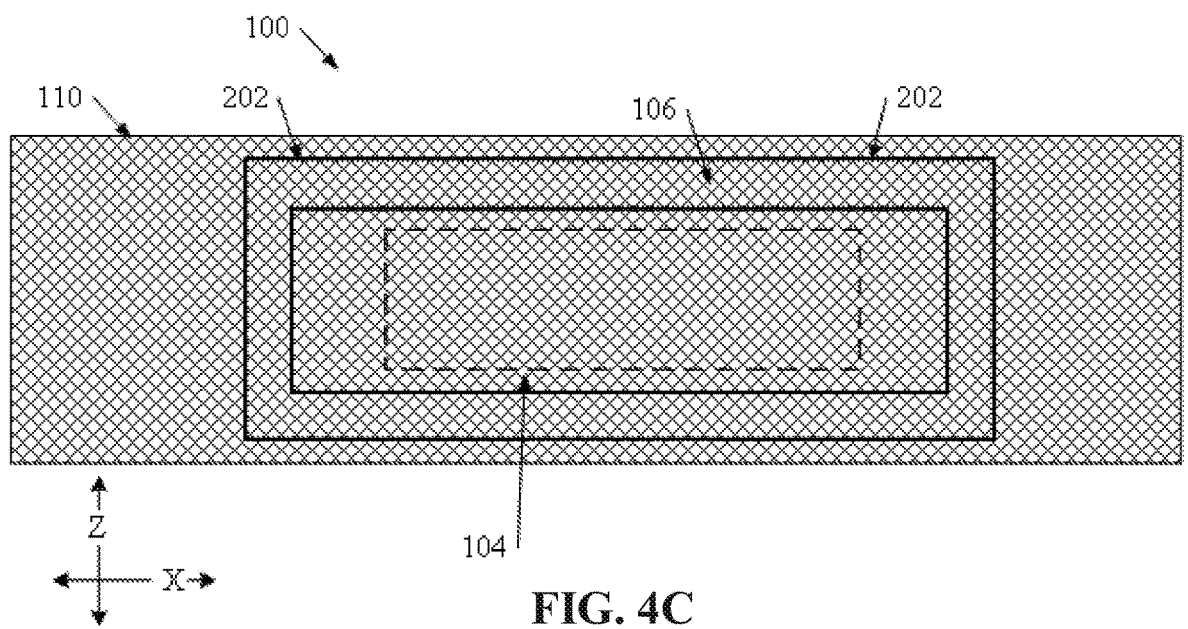
FIG. 4C illustrates a diagram of an example, non-limiting bottom-up view of a thin film battery during a first manufacturing stage in accordance with one or more embodiments described herein.

FIG. 4C illustrates a diagram of an example, non-limiting bottom-up view of a thin film battery 100 during the first stage of manufacturing in accordance with one or more embodiments described herein. Repetitive description of like elements employed in other embodiments described herein is omitted for sake of brevity. As shown in FIG. 4C, the dashed lines can indicate the location of the one or more thin film battery cells 104 within the battery panel. FIG. 4C depicts an embodiment in which the one or more first trenches 202 partially or completely surround the one or more thin film battery cells 104 while extending through a portion of the thickness (e.g., along the "Y" axis shown in FIG. 4B) of the battery panel. Since the one or more first trenches 202 do not extend entirely through the thickness of the battery panel, one or more portions of the battery panel (e.g., the first substrate layer 106) can connect the section of the battery panel housing the one or more thin film battery cells 104 and the rest of the battery panel. The one or more connections established by the described one or more portions of battery panel can facilitate maintaining an integrity of the thin film battery 100 as it proceeds to further stages of development.

Figure 5A:
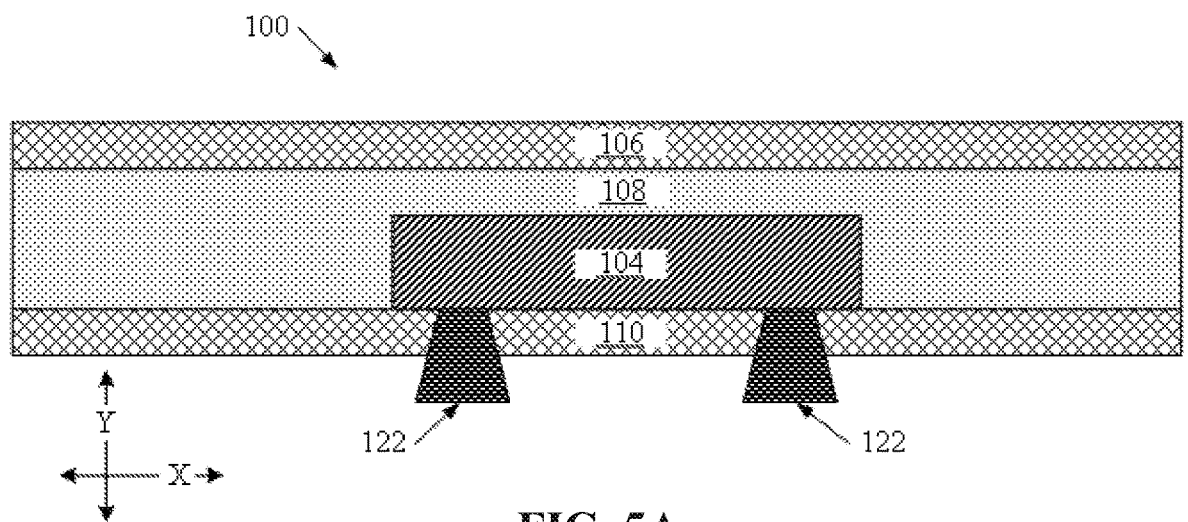
FIG. 5A illustrates a diagram of an example, non-limiting thin film battery cell embedded within a battery panel from which a sealed thin film battery can be derived in accordance with one or more embodiments described herein.

FIG. 5A illustrates a diagram of an example, non-limiting side view of a thin film battery cell 104 comprised within a battery panel in accordance with one or more embodiments described herein. Repetitive description of like elements employed in other embodiments described herein is omitted for sake of brevity. FIG. 5A depicts the features described herein with regards to FIG. 2A but illustrated on the same page as FIGS. 5B and 5C to ease visualization of another embodiment of the first stage of manufacturing the thin film battery 100.

Figure 5B:
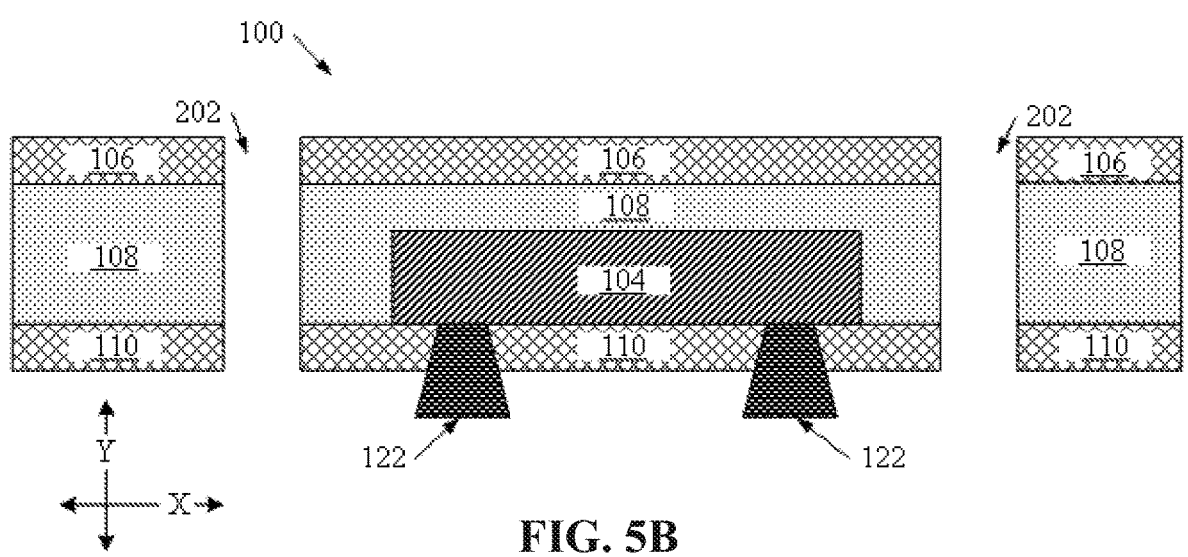
FIG. 5B illustrates a diagram of an example, non-limiting side view of a thin film battery during a first manufacturing stage in accordance with one or more embodiments described herein.

FIG. 5B illustrates a diagram of an example, non-limiting side view of a thin film battery 100 during a first stage of manufacturing in accordance with one or more embodiments described herein. Repetitive description of like elements employed in other embodiments described herein is omitted for sake of brevity. FIG. 5B depicts an alternate embodiment of the first stage of manufacturing (e.g., the first cutting processes to form one or more first trenches 202) in which a plurality of first trenches 202 can be located adjacent to each other and extend through a thickness (e.g., an entire thickness) of the battery panel (e.g., along the "Y" axis shown in FIG. 5B).

As shown in FIG. 5B, in one or more embodiments the first cut can comprise cutting one or more first trenches 202 through an entire thickness (e.g., along the "Y" axis shown in FIG. 2B) of the battery panel. Thus, the depth of the one or more first trenches 202 can be dependent on the thickness of the battery panel. Additionally, a width (e.g., along the "X" axis shown in FIG. 2B) of the one or more first trenches 202 can vary depending on the materials comprising the one or more sealing layers 102. For instance, an exemplary width of the one or more first trenches 202 can be greater than or equal to 2 microns and less than or equal to tens of millimeters (e.g., between 2 microns and 1000 microns). Further, cutting the one or more first trenches 202 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like. In one or more embodiments, the depth of the one or more first trenches 202 can be less than the thickness of the battery panel (e.g., as described herein with regards to FIGS. 3B and/or 4B).

Figure 5C:
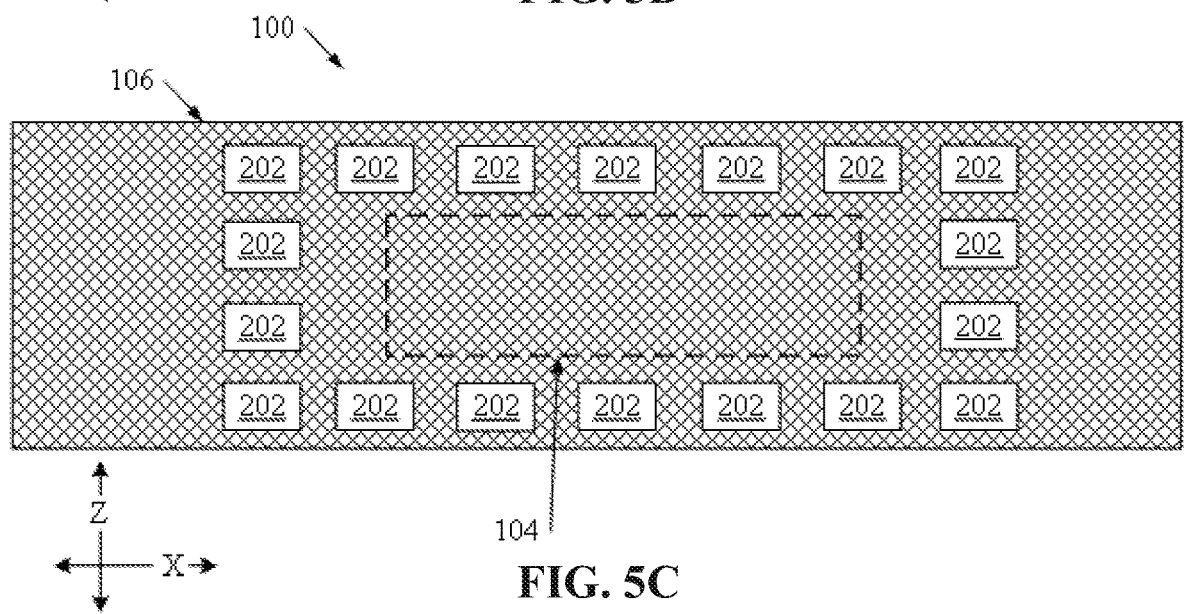
FIG. 5C illustrates a diagram of an example, non-limiting top-down view of a thin film battery during a first manufacturing stage in accordance with one or more embodiments described herein.

FIG. 5C illustrates a diagram of an example, non-limiting top-down view of a thin film battery 100 during the first stage of manufacturing in accordance with one or more embodiments described herein. Repetitive description of like elements employed in other embodiments described herein is omitted for sake of brevity. As shown in FIG. 5C, the dashed lines can indicate the location of the one or more thin film battery cells 104 within the battery panel. FIG. 5C depicts an embodiment in the first cutting creates a plurality of first trenches 202, which can be separated from each other by a defined distance. The plurality of first trenches 202 can extend entirely through the battery panel (e.g., as shown in FIG. 5C) or partially through the thickness of the battery panel. Since plurality of first trenches 202 do not connect to each other, one or more portions of the battery panel (e.g., portions of the battery panel located between first trenches 202) can connect the section of the battery panel housing the one or more thin film battery cells 104 and the rest of the battery panel. The one or more connections established by the described one or more portions of battery panel can facilitate maintaining an integrity of the thin film battery 100 as it proceeds to further stages of development.

FIGS. 2A-5C depict various embodiments of the first manufacturing stage, each depicting different geometries, dimensions, locations, and/or arrangements of the one or more first trenches 202. One of ordinary skill in the art will recognize the first manufacturing stage described herein is not limited to a single embodiment, rather a combination of the various embodiments described herein is also envisaged.

Figure 6:
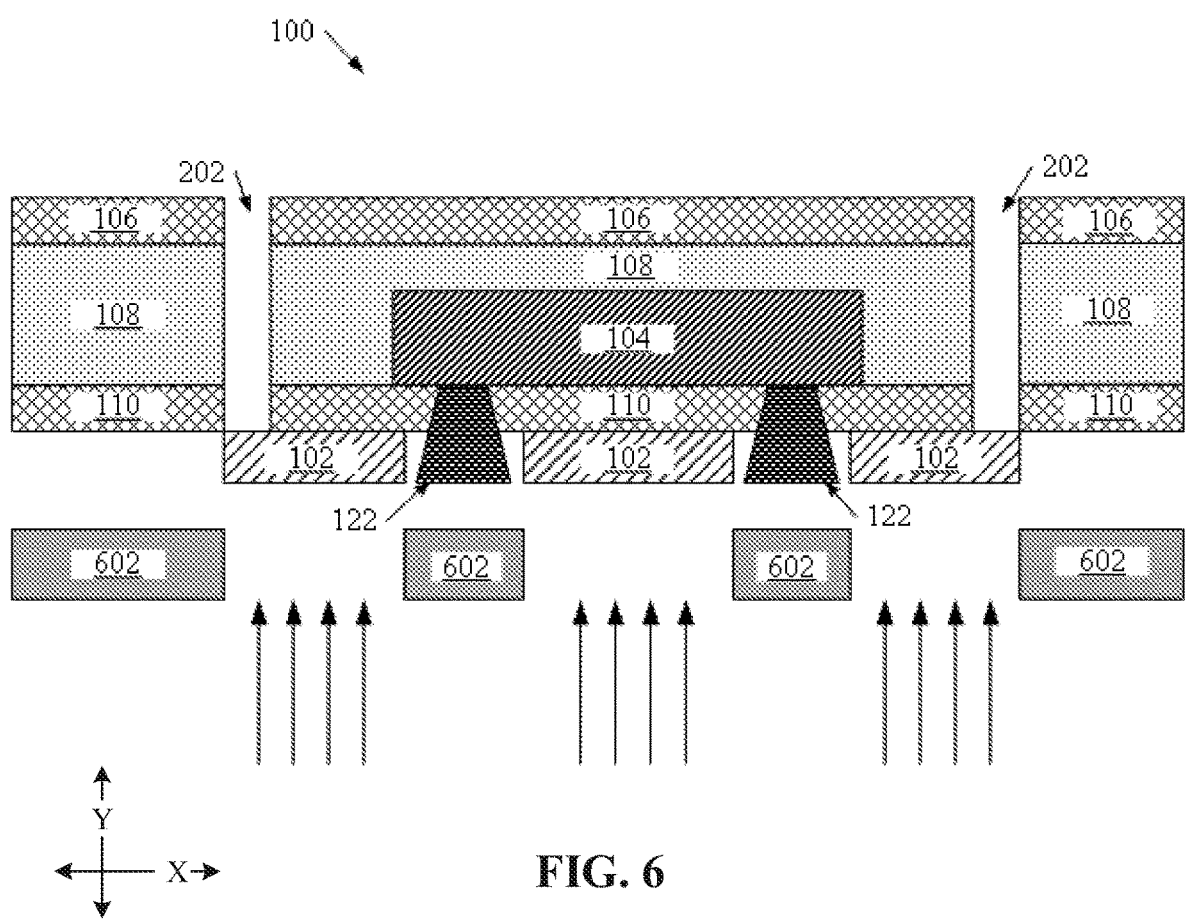
FIG. 6 illustrates a diagram of an example, non-limiting side view of a thin film battery during a second manufacturing stage in accordance with one or more embodiments described herein.

FIG. 6 illustrates a diagram of an example, non-limiting side view of a thin film battery 100 during a second stage of manufacturing in accordance with one or more embodiments described herein. Repetitive description of like elements employed in other embodiments described herein is omitted for sake of brevity. At a second stage of the manufacturing process, one or more portions of the one or more sealing layers 102 can be deposited onto the battery panel. FIG. 6 illustrates a thin film battery 100 that has undergone the first manufacturing stage in accordance with the embodiment described herein with regards to FIGS. 2A-2C. However, the features of the second stage of manufacturing described herein can be applied to thin film batteries 100 that have undergone the first stage of manufacturing in accordance with any of the embodiments described herein.

As shown in FIG. 6, a masking layer 602 can be used to direct the deposition of one or more portions of the one or more sealing layers 102 to specific sites of the battery panel. For example, portions of the battery panel that do not house the one or more thin film battery cells 104 can be protected from deposition by the masking layer 602. Additionally, the one or more vias 122 can be protected from deposition by the masking layer 602. In contrast, one or more portions of the one or more sealing layers 102 can be deposited in areas not covered by the masking layer 602. For instance, the one or more portions of the one or more sealing layers 102 can be deposited onto the second substrate layer 110 that comprises the portion of the battery panel that houses the one or more thin film battery cells 104. Additionally, the one or more portions of the one or more sealing layers 102 can be deposited adjacent to and/or into the one or more first trenches 202.

Example materials that can comprise the masking layer 602 can include, but are not limited to: ceramic, stainless steal, molybdenum, silicon, glass (e.g., a chrome pattern on glass), polymer, a combination thereof, and/or the like (e.g., an alternate material layers that can prevent exposure to radiation for patterning). For example, the masking layer 602 can be a hard mask layer. Additionally, deposition (e.g., as indicated by the plurality of arrows shown in FIG. 6) of the one or more sealing layers 102 can be facilitated by one or more deposition processes including, but not limited to: plating, sputtering, evaporation, chemical vapor deposition ("CVD"), plasma enhanced vapor deposition ("PECVD"), chemical plating, a combination thereof, and/or the like.

Figure 7:
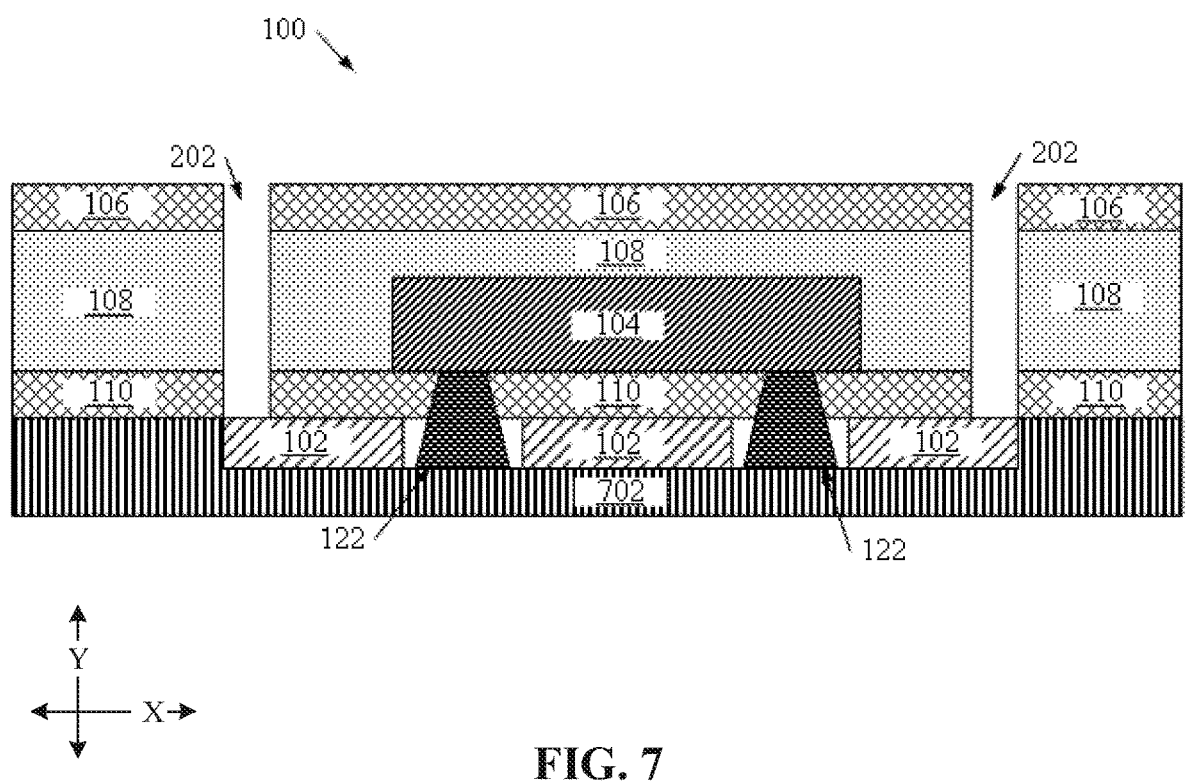
FIG. 7 illustrates a diagram of an example, non-limiting side view of a thin film battery during a third manufacturing stage in accordance with one or more embodiments described herein.

FIG. 7 illustrates a diagram of an example, non-limiting side view of a thin film battery 100 during a third stage of manufacturing in accordance with one or more embodiments described herein. Repetitive description of like elements employed in other embodiments described herein is omitted for sake of brevity. At a third stage of the manufacturing process, a handling tape 702 can be attached to the thin film battery 100 and/or the battery panel. FIG. 7 illustrates a thin film battery 100 that has undergone the first manufacturing stage in accordance with the embodiment described herein with regards to FIGS. 2A-2C. However, the features of the third stage of manufacturing described herein can be applied to thin film batteries 100 that have undergone the first stage of manufacturing in accordance with any of the embodiments described herein. As shown in FIG. 7, the handling tape 702 can be attached to one or more portions of deposited sealing layers 102. Additionally, the handling tape 702 can be attached to the battery panel. Further, the handling tape 702 can cover the one or more vias 122.

Example handling tapes 702 can include, but are not limited to: ultraviolet ("UV") releasing tape, thermal releasing tape, glass, silicon, a combination thereof, and/or the like. One of ordinary skill in the art will recognize that a thickness of the handling tape 702 (e.g., along the "Y" axis shown in FIG. 7) can varying depending on the materials comprising the handling tape 702 and/or the preferences of the manufacturer. For instance, an exemplary thickness of the handling tape 702 can be greater than or equal to 10 microns and less than or equal to tens of millimeters (e.g., between 10 microns and 400 microns). Advantageously, the handling tape 702 can provide further mechanical support for the thin film battery 100 during the manufacturing process. Advantageously, the handling tape 702 can provide for low cost, precision handling of the one or more thin film batteries 100 through build and sealing operations (e.g., the various stages of manufacturing described herein) and support fabrication of a plurality of thin film batteries 100 from a multitude of thin film battery cells 104 positioned with high density within the battery panel.

Figure 8:
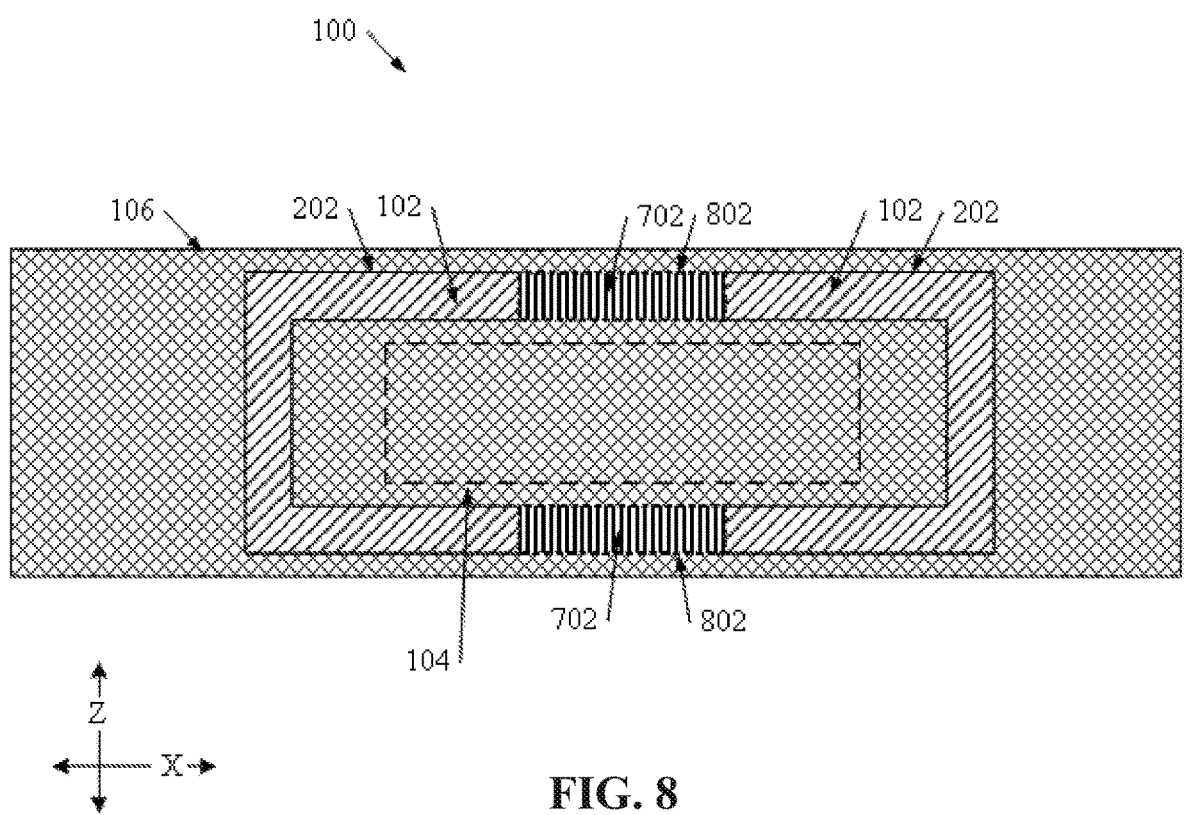
FIG. 8 illustrates a diagram of an example, non-limiting top-down view of a thin film battery during a fourth manufacturing stage in accordance with one or more embodiments described herein.

FIG. 8 illustrates a diagram of an example, non-limiting top-down view of a thin film battery 100 during a fourth stage of manufacturing in accordance with one or more embodiments described herein. Repetitive description of like elements employed in other embodiments described herein is omitted for sake of brevity. At a fourth stage of the manufacturing process, a second cutting can form one or more second trenches 802 to facilitate isolation of the portion of the battery panel housing the one or more thin film battery cells 104 from the rest of the battery panel. As shown in FIG. 8, the dashed lines can indicate the location of the one or more thin film battery cells 104 within the battery panel.

FIG. 8 illustrates a thin film battery 100 that has undergone the first manufacturing stage in accordance with the embodiment described herein with regards to FIGS. 2A-2C. However, the features of the fourth stage of manufacturing described herein can be applied to thin film batteries 100 that have undergone the first stage of manufacturing in accordance with any of the embodiments described herein.

As shown in FIG. 8, the one or more second trenches 802 are depicted with dotted lines. The one or more second trenches 802 can connect to the one or more first trenches 202. Together, the one or more first trenches 202 and the one or more second trenches 802 can form a continuous trench that can surround the portion of the battery panel that houses the one or more thin film battery cells 104 and thereby define one or more dimensions of the thin film battery 100. The one or more second trenches 802 can have the same and/or substantially similar dimensions as the one or more first trenches 202, or the one or more second trenches 802 can have different dimensions than the one or more first trenches 202. Further, cutting the one or more second trenches 802 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like. As a result of the fourth stage of the manufacturing process, the portion of the battery panel housing the one or more thin film battery cells 104 can be connected to the rest of the battery panel solely via the handling tape 702. Advantageously, the handling tape 702 can provide support to the thin film battery 100 that would be otherwise lost due the isolation achieved by the one or more second trenches 802.

Figure 9A:
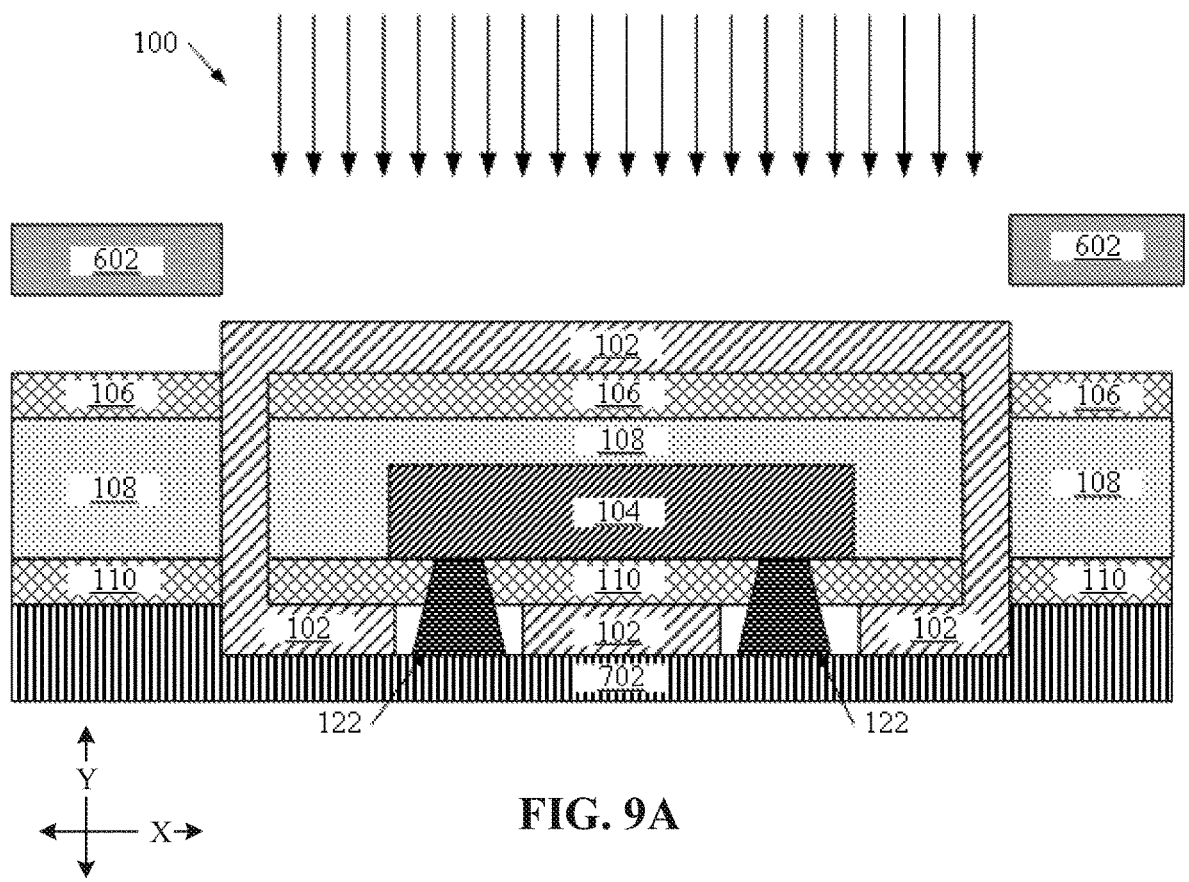
FIG. 9A illustrates a diagram of an example, non-limiting side view of a thin film battery during a fifth manufacturing stage in accordance with one or more embodiments described herein.

FIG. 9A illustrates a diagram of an example, non-limiting side view of a thin film battery 100 during a fifth stage of manufacturing in accordance with one or more embodiments described herein. Repetitive description of like elements employed in other embodiments described herein is omitted for sake of brevity. At a fifth stage of the manufacturing process, the remaining portions of the one or more sealing layers 102 can be deposited onto the battery panel.

As shown in FIG. 9A, the masking layer 602 can be used again to direct one or more second depositions of the remaining or more sealing layers 102 to specific sites of the battery panel. For example, portions of the battery panel that do not house the one or more thin film battery cells 104 can be protected from deposition by the masking layer 602. In contrast, one or more portions of the one or more sealing layers 102 can be deposited in areas not covered by the masking layer 602. For instance, the one or more sealing layers 102 can be deposited onto the first substrate layer 106 that comprises the portion of the battery panel that houses the one or more thin film battery cells 104. Additionally, the one or more sealing layers 102 can be deposited adjacent to and/or into the one or more first trenches 202 and/or the one or more second trenches 802. The deposition (e.g., as indicated by the plurality of arrows shown in FIG. 9A) of the one or more sealing layers 102 can be facilitated by one or more deposition processes including, but not limited to: plating, sputtering, evaporation, CVD, PECVD, chemical plating, a combination thereof, and/or the like.

Figure 9B:
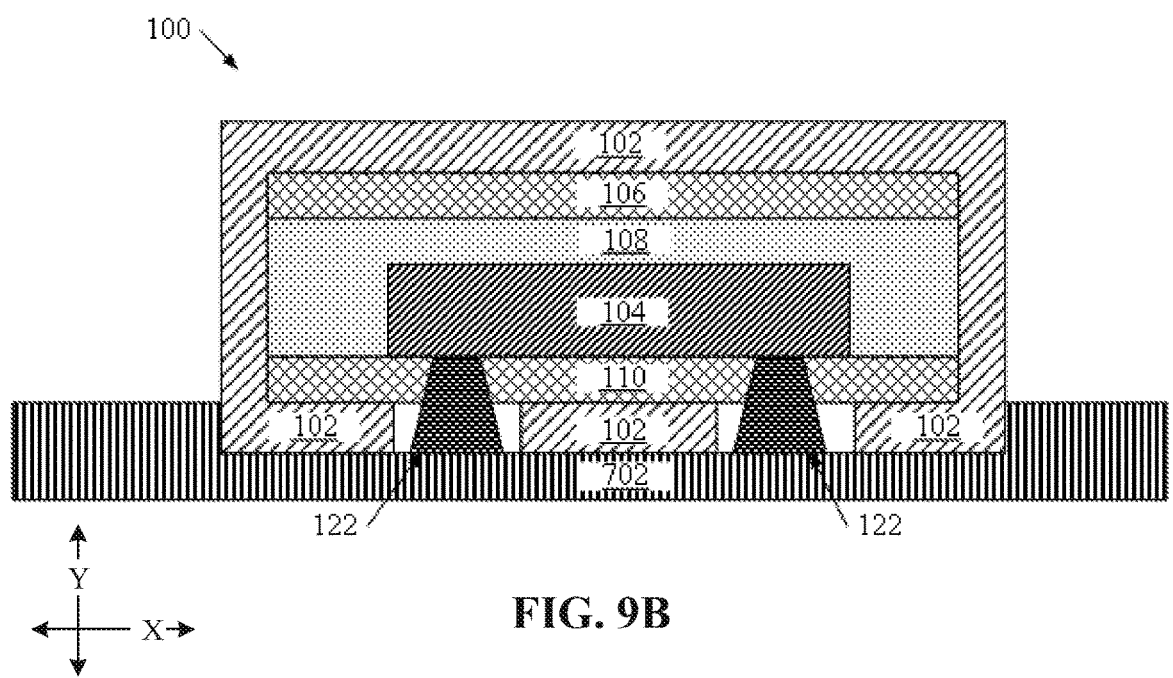
FIG. 9B illustrates a diagram of an example, non-limiting side view of a thin film battery during a sixth manufacturing stage in accordance with one or more embodiments described herein.

FIG. 9B illustrates a diagram of an example, non-limiting side view of a thin film battery 100 during a sixth stage of manufacturing in accordance with one or more embodiments described herein. Repetitive description of like elements employed in other embodiments described herein is omitted for sake of brevity. At a sixth stage of the manufacturing process, the thin film battery 100 can be separated from the adjacent battery panel. Advantageously, the handling tape 702 can facilitate separation of the thin film battery 100 and the battery panel. Additionally, the handling tape 702 can be removed to achieve the structure depicted in FIG. 1A.

Figure 10A:
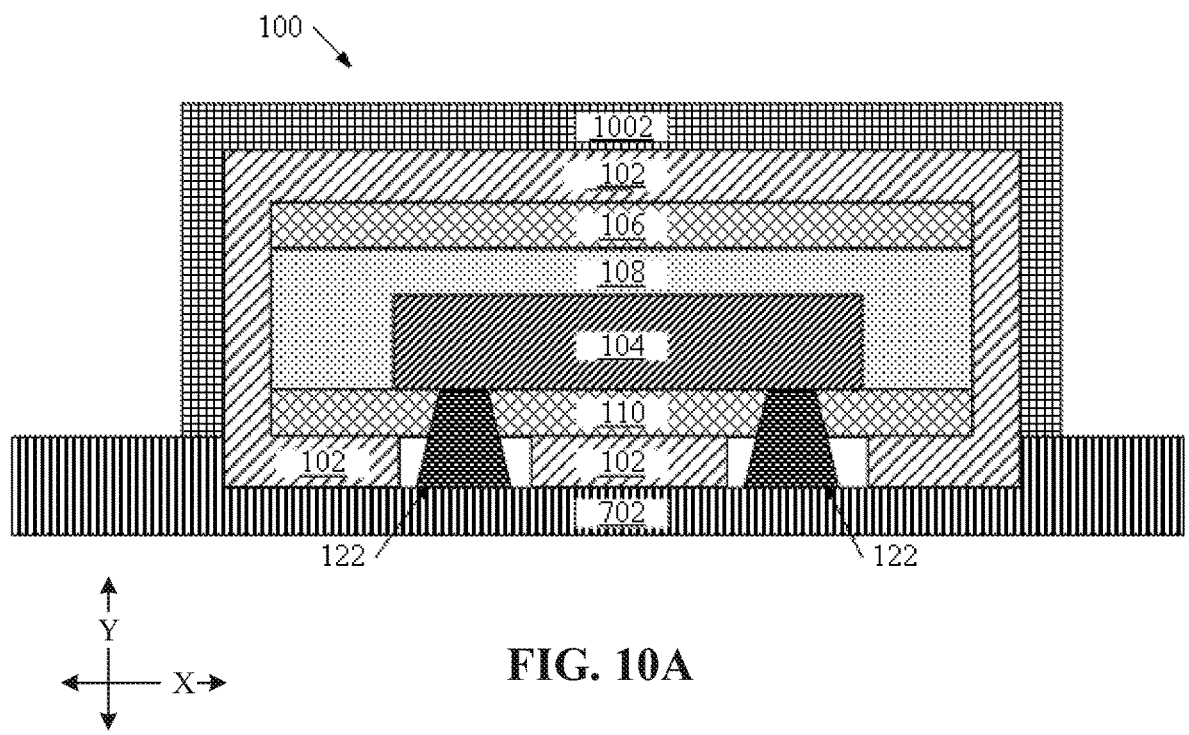
FIG. 10A illustrates a diagram of an example, non-limiting side view of a thin film battery during a seventh manufacturing stage in accordance with one or more embodiments described herein.

FIG. 10A illustrates a diagram of an example, non-limiting side view of a thin film battery 100 further comprising one or more dielectric layers 1002 in accordance with one or more embodiments described herein. Repetitive description of like elements employed in other embodiments described herein is omitted for sake of brevity. As shown in FIG. 10A, the thin film battery 100 can further comprise one or more dielectric layers 1002 adjacent to the one or more sealing layers 102. The one or more dielectric layers 1002 can be deposited onto the one or more sealing layers 102. For example, the one or more dielectric layers 1002 can surround the one or more sealing layers 102. FIG. 10A depicts a first deposition of the one or more dielectric layers 1002, wherein the handling tape 702 can be attached to a first side of the thin film battery 100 (e.g., a bottom side as shown in FIG. 10A).

Example dielectric materials that can comprise the one or more dielectric layers 1002 can include, but are not limited to: polymers, metal oxides, ceramics, silicon oxides, a combination thereof, and/or the like. A thickness of the one or more dielectric layers 1002 can vary depending on the function of the thin film battery 100 and/or the materials comprising the one or more dielectric layers 1002. For example, the thickness of the one or more dielectric layers 1002 can be greater than or equal to 0.5 microns and less than or equal to several millimeters (e.g., between 0.5 microns and 100 microns). The one or more dielectric layers 1002 can be deposited onto the one or more sealing layers 102 by one or more deposition processes, including, but not limited to: CVD, dipping, spraying, spin-coating, evaporation, sputtering, a combination thereof, and/or the like.

Figure 10B:
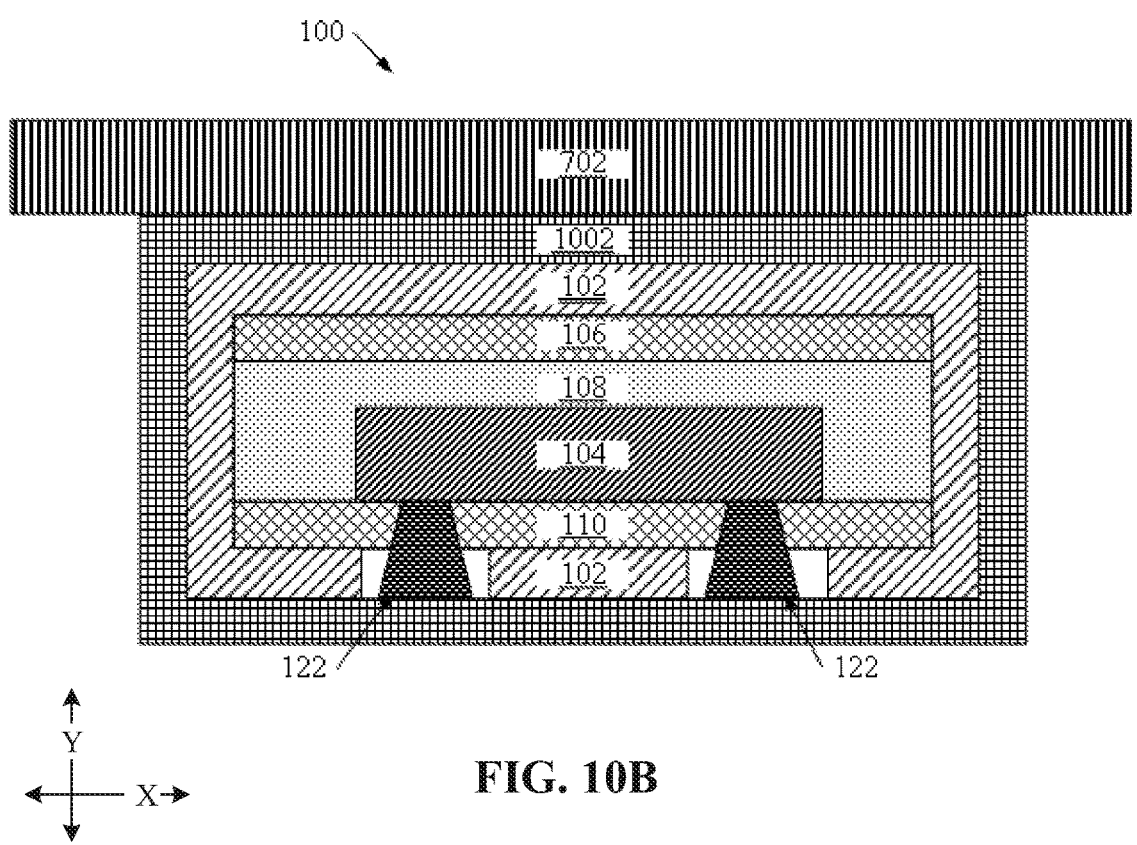
FIG. 10B illustrates a diagram of an example, non-limiting side view of a thin film battery during an eighth manufacturing stage in accordance with one or more embodiments described herein.

FIG. 10B illustrates a diagram of an example, non-limiting side view of a thin film battery 100 further comprising one or more dielectric layers 1002 in accordance with one or more embodiments described herein. Repetitive description of like elements employed in other embodiments described herein is omitted for sake of brevity. As shown in FIG. 10B, the handling tape 702 can be re-located to another side of the thin film battery 100 (e.g., the top side as shown in FIG. 10B) to facilitate a second deposition of the one or more dielectric layers 1002. For example, the second deposition can facilitate depositing the one or more dielectric layers 1002 onto locations previously covered by the handling tape 702 during the first deposition of the dielectric layers 1002 (e.g., as shown in FIG. 10A). For instance, the second deposition of the one or more dielectric layers 1002 can facilitate depositing the one or more dielectric layers 1002 in such a manner that the one or more dielectric layers 1002 surround the one or more sealing layers 102.

The second disposition of the one or more dielectric layers 1002 can facilitated by the same deposition process utilized to facilitate the first disposition, or the second disposition of the one or more dielectric layers 1002 can facilitated by a different deposition process utilized to facilitate the first disposition. For example, the second disposition can be facilitated by one or more deposition processes, including, but not limited to: CVD, dipping, spraying, spin-coating, evaporation, sputtering, a combination thereof, and/or the like. Advantageously, the one or more dielectric layers 1002 can protect the one or more sealing layers 102 from deterioration and/or corrosion (e.g., caused by one or more environmental conditions such as the presence of oxygen, water, and/or ambient gases). Additionally, the one or more dielectric layers 1002 can facilitate in forming a dielectric hermetic seal around the one or more thin film battery cells 104.

In one or more embodiments, the one or more dielectric layers 1002 can surround the one or more sealing layers 102. Further, in various embodiments the one or more dielectric layers 1002 can be positioned onto the one or more sealing layers 102 at desired locations. For example, the one or more dielectric layers 1002 can be positioned between the one or more sealing layers 102 and the one or more vias 122 (e.g., the one or more vias 122 that can extend through the battery panel) to facilitate the creation and/or sustainment of a hermetic seal.

Further, while FIGS. 10A and 10B depict the one or more sealing layers 102 between the one or more dielectric layers 1002 and one or more thin film battery cells 104, the architecture of the thin film battery 100 is not so limited. For example, the one or more dielectric layers 1002 can be deposited prior to the one or more sealing layers 102 such that the one or more dielectric layers 1002 can be positioned between the one or more thin film battery cells 104 and the one or more sealing layers 102.

FIG. 11 illustrates a flow diagram of an example, non-limiting method 1100 that can facilitate manufacturing one or more thin film batteries 100 in accordance with one or more embodiments described herein. Repetitive description of like elements employed in other embodiments described herein is omitted for sake of brevity.

At 1102, the method 1100 can comprise cutting one or more trenches (e.g., one or more first trenches 202 and/or one or more second trenches 802) into a battery panel (e.g., which can comprise a first substrate layer 106, one or more adhesive layers 108, and/or a second substrate layer 110) to isolate one or more thin film battery cells 104 from a portion of the battery panel. In one or more embodiments, the cutting can comprise a multi-step cutting process. The cutting ca be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like.

At 1104, the method 1100 can comprise depositing one or more metals onto the battery panel and into the one or more trenches to form a hermetic seal around the one or more thin film battery cells 104. The one or more metals can be comprised within one or more sealing layers 102 that can surround and/or partially surround the one or more thin film battery cells 104. For example, the one or more sealing layers 102 can be one or more metal layers, which can include but not limited to: titanium, copper, aluminum, nickel, indium, tin, chromium, cobalt, gold, silicon, alloys thereof, and oxides thereof, a combination thereof, and/or the like. Advantageously, the one or more metals deposited at 1104 can form one or more sealing layers 102 that can enhance the mechanical strength of the thin film battery 100 and/or protect one or more components of the thin film battery 100 from deterioration.

Figure 12:
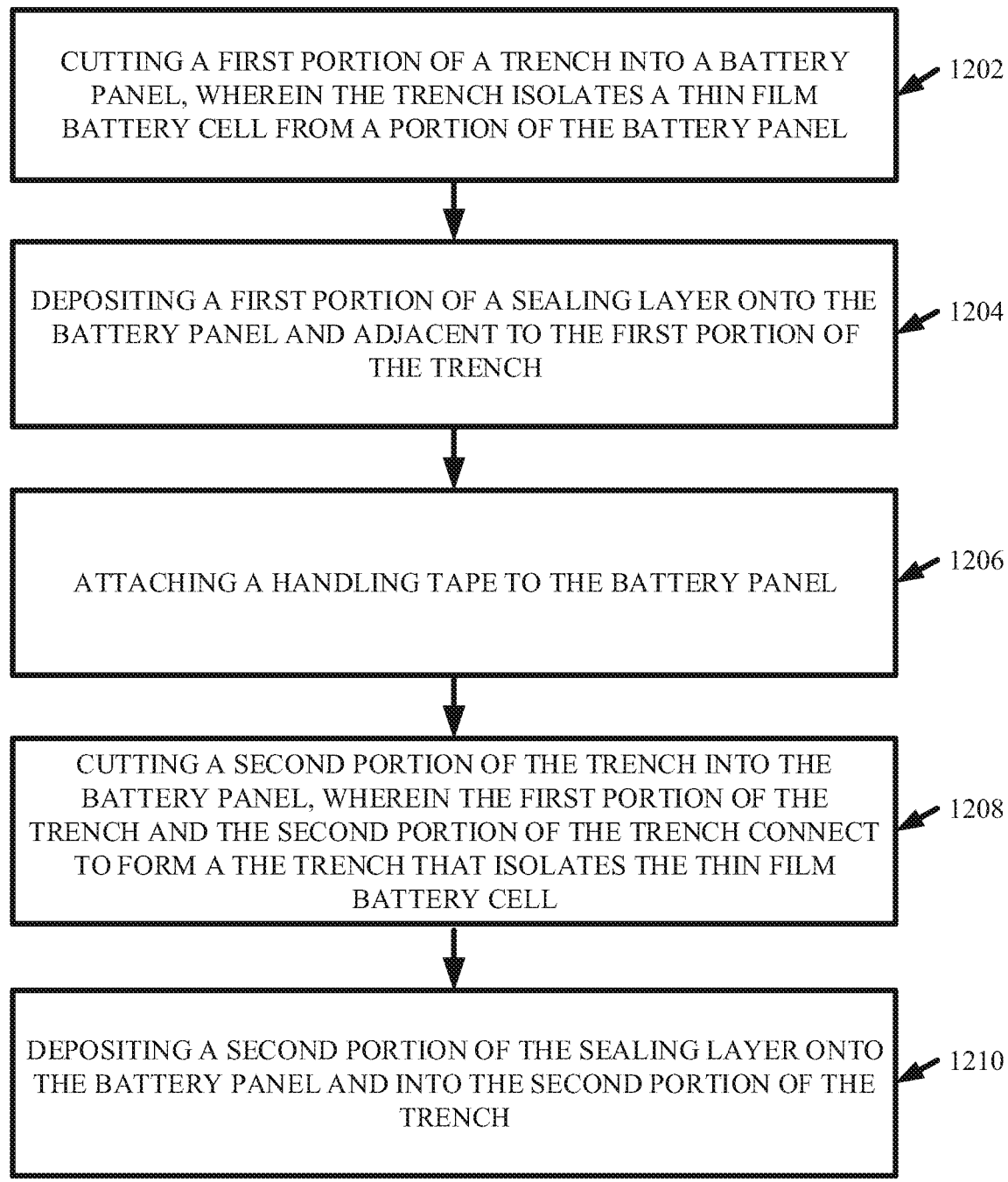
FIG. 12 illustrates a flow diagram of an example, non-limiting method that can facilitate manufacturing one or more thin film batteries comprising one or more sealing layers in accordance with one or more embodiments described herein.

FIG. 12 illustrates a flow diagram of an example, non-limiting method 1200 that can facilitate manufacturing one or more thin film batteries 100 in accordance with one or more embodiments described herein. Repetitive description of like elements employed in other embodiments described herein is omitted for sake of brevity.

At 1202, the method 1200 can comprise cutting one or more first portions (e.g., the one or more first trenches 202) of a trench into a battery panel (e.g., which can comprise a first substrate layer 106, one or more adhesive layers 108, and/or a second substrate layer 110). The trench can isolate one or more thin film battery cells 104 from a portion of the battery panel. The cutting at 1202 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like. In one or more embodiments, the one or more first portions of the trench can extend through a thickness of the battery panel along a portion of a perimeter of the one or more thin film battery cells 104 (e.g., as described herein with regards to FIGS. 2B-2C). In one or more embodiments, the one or more first portions of the trench can be located along a perimeter of the one or more thin film battery cells 104 and can have a depth that is less than a thickness of the battery panel (e.g., as described herein with regards to FIGS. 3B-3C and/or 4B-4C). The one or more first portions of the trench can extend from a first surface (e.g., the first substrate layer 106) of the battery panel or from a second surface (e.g., the second substrate layer 110) of the battery panel, which can be opposite the first surface. In one or more embodiments, the one or more first portions of the trench can comprise a plurality of adjacent trenches located along a perimeter of the one or more thin film battery cells 104 (e.g., as described herein with regards to FIGS. 5B-5C).

At 1204, the method 1200 can comprise depositing one or more first portions of one or more sealing layers 102 onto the battery panel and adjacent to the one or more first portions of the trench (e.g., as described herein with regards to FIG. 6). The depositing at 1204 can be facilitated by one or more deposition process that can include, but are not limited to: plating, sputtering, evaporation, CVD, PECVD, chemical plating, a combination thereof, and/or the like. For example, the depositing at 1204 can comprise one or more masking layers 602 (e.g., a hard mask layer) to facilitate directing the deposition of the one or more first portions of the one or more sealing layers 102.

At 1206, the method 1200 can comprise attaching a handling tape 702 to the battery panel (e.g., as described herein with regards to FIG. 7). Example handling tapes 702 can include, but are not limited to: UV releasing tape, thermal releasing tape, glass, silicon, a combination thereof, and/or the like. The handling tape 702 can provide structural support to the thin film battery 100 as the method 1200 proceeds.

At 1208, the method 1200 can comprise cutting one or more second portions of the trench into the battery panel (e.g., as described herein with regards to FIG. 8). The one or more first portions of the trench and the one or more second portions of the trench can connect to isolate the one or more thin film battery cells 104. The cutting at 1208 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like.

At 1210, the method 1200 can comprise depositing one or more second portions of the one or more sealing layers 102 onto the battery panel and/or into the one or more second portions of the trench (e.g., as described herein with regards to FIG. 9A). The depositing at 1208 can be facilitated by one or more deposition process that can include, but are not limited to: plating, sputtering, evaporation, CVD, PECVD, chemical plating, a combination thereof, and/or the like. For example, the depositing at 1208 can comprise one or more masking layers 602 (e.g., a hard mask layer) to facilitate directing the deposition of the one or more first portions of the one or more sealing layers 102. The one or more second portions of the one or more sealing layers 102 can connect to the one or more first portions of the one or more sealing layers 102 to surround and/or partially surround the one or more thin film battery cells 104. In one or more embodiments, the depositing at 1210 can create a hermetic seal around the one or more thin film battery cells 104. Advantageously, the one or more sealing layers 102 can also provide mechanical strength to the one or more thin film batteries 100.

Additionally, the method 1200 can optionally comprise depositing one or more dielectric layers 1002 adjacent to the one or more sealing layers 102 (e.g., as described herein with regards to FIGS. 10A-10B). The one or more dielectric layers 1002 can surround and/or partially surround the one or more sealing layers 102. Advantageously, the one or more dielectric layers 1002 can protect the one or more sealing layers 102 can facilitate in forming a dielectric hermetic seal.

FIG. 13 illustrates a flow diagram of an example, non-limiting method 1300 that can facilitate manufacturing one or more thin film batteries 100 in accordance with one or more embodiments described herein. Repetitive description of like elements employed in other embodiments described herein is omitted for sake of brevity.

At 1302, the method 1300 can comprise cutting one or more first portions of a trench into a battery panel (e.g., which can comprise a first substrate layer 106, one or more adhesive layers 108, and/or a second substrate layer 110). For example, the cutting at 1302 can form the one or more first trenches 202 described herein with regards to FIGS. 2B-2C, 3B-3C, 4B-4C, and/or 5B-5C. Also, the cutting at 1302 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like. Additionally, the method 1300 can comprise depositing one or more portions of one or more sealing layers 102 onto a section of the battery panel that houses one or more thin film battery cells 104 and/or adjacent to the one or more first portions of the trench (e.g., as described herein with regards to in FIG. 6).

At 1304, the method 1300 can comprise attaching a handling tape 702 to the battery panel (e.g., as described herein with regards to FIG. 7). Example handling tapes 702 can include, but are not limited to: UV releasing tape, thermal releasing tape, glass, silicon, a combination thereof, and/or the like. The handling tape 702 can provide structural support to the thin film battery 100 as the method 1300 proceeds.

At 1306, the method 1300 can comprise isolating the one or more thin film battery cells 104 by cutting one or more second portions of the trench into the battery panel. The one or more second portions of the trench can connect to the one or more first portions of the trench (e.g., as described herein with regards to FIG. 8). For example, the cutting at 1306 can form the one or more second trenches 802 described herein with regards to FIG. 8. Also, the cutting at 1306 can be facilitated by one or more cutting processes, which can include, but are not limited to: laser milling, etching (e.g., wet etching and/or dry etching), punching and/or drilling (e.g., mechanically), snapping and/or breaking, a combination thereof, and/or the like. Additionally, the method 1300 can further comprise depositing one or more remaining portions of the one or more sealing layers 102 onto another section of the battery panel that houses one or more thin film battery cells 104 and/or into the one or more second portions of the trench (e.g., as described herein with regards to in FIG. 9A).

One of ordinary skill in the art will recognize that the various features and/or embodiments of the stages of manufacturing described herein with regards to FIG. 2A-10B can facilitate the various features and/or embodiments of the methods described herein (e.g., method 1100, method 1200, and/or method 1300). Further, the various methods described herein can facilitate manufacturing of one or more thin film batteries 100 comprising one or more sealing layers 102 that can form a hermetic seal around one or more thin film battery cells 104.

The term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
a thin film battery cell isolated from a portion of a battery panel via a trench, and encapsulated in a multi-layer stack comprising an adhesive layer located between a first substrate layer and a second substrate layer; and
a metal sealing layer at least partially surrounding the multi-layer stack.

2. The apparatus of claim 1, wherein the metal sealing layer forms a hermetic seal around the thin film battery cell and the multi-layer stack.

3. The apparatus of claim 1, wherein the metal sealing layer comprises a metal selected from a group consisting of titanium, copper, aluminum, nickel, indium, tin, chromium, cobalt, gold, silicon, alloys thereof, and oxides thereof.

4. The apparatus of claim 1, further comprising an electrical terminal operably coupled to the thin film battery cell and extending through the second substrate layer and the metal sealing layer.

5. The apparatus of claim 1, further comprising a dielectric layer adjacent to the metal sealing layer, wherein the dielectric layer comprises a material selected from a group consisting of a polymer, a metal oxide, and a ceramic.

6. The apparatus of claim 5, wherein the metal sealing layer is located between the multi-layer stack and the dielectric layer.

7. The apparatus of claim 5, wherein the dielectric layer is located between the multi-layer stack and the metal sealing layer.

8. The apparatus of claim 1, wherein the metal sealing layer is adjacent to the adhesive layer, the first substrate layer, and the second substrate layer, and wherein the metal sealing layer is located at a perimeter of the multi-layer stack.

9. A method, comprising:
cutting a trench into a battery panel to isolate a thin film battery cell from a portion of the battery panel wherein the cutting comprises a first cutting of the battery panel and a second cutting of the battery panel, and wherein the method further comprises attaching a handling tape to the battery panel between the first cutting and the second cutting; and
depositing a metal layer onto the battery panel and into the trench to form a bond around the thin film battery cell.

10. The method of claim 9, wherein the first cutting comprises cutting a first portion of the trench, wherein the second cutting comprises cutting a second portion of the trench, and wherein the first portion of the trench and the second portion of the trench connect to form the trench.

11. The method of claim 10, wherein the first portion of the trench extends through a thickness of the battery panel along a portion of a perimeter of the thin film battery cell.

12. The method of claim 10, wherein the first portion of the trench is located along a perimeter of the thin film battery cell and has depth that is less than a thickness of the battery panel.

13. The method of claim 10, wherein the first portion of the trench comprises a plurality of adjacent trenches located along a perimeter of the thin film battery cell.

14. The method of claim 10, wherein the cutting comprises laser milling the battery panel to form the trench, and wherein the depositing comprises a process selected from a group consisting of plating, sputtering, evaporation, chemical vapor deposition, plasma enhanced vapor deposition, and chemical plating.

15. A method, comprising:
cutting a first portion of a trench into a battery panel;
attaching a handling tape to the battery panel;
isolating a thin film battery cell by cutting a second portion of the trench into the battery panel; and
depositing a metal layer onto the battery panel and into the trench to form a hermetic seal around the thin film battery cell, wherein the metal is selected from a group consisting of titanium, copper, aluminum, nickel, indium, tin, chromium, cobalt, gold, silicon, alloys thereof, and oxides thereof.

16. The method of claim 15, wherein the first portion of the trench extends through a thickness of the battery panel along a portion of a perimeter of the thin film battery cell.

17. The method of claim 15, wherein the first portion of the trench is located along a perimeter of the thin film battery cell and has depth that is less than a thickness of the battery panel.

18. The method of claim 15, wherein the cutting comprises a multi-step laser milling process, and wherein the handling tape comprises a material selected from a group consisting of ultraviolet releasing tape, thermal releasing tape, and glass.

\* \* \* \* \*